US008678926B2

(12) United States Patent
Ohsawa et al.

(10) Patent No.: US 8,678,926 B2
(45) Date of Patent: Mar. 25, 2014

(54) COMPUTER-READABLE STORAGE MEDIUM, INFORMATION PROCESSING APPARATUS, SYSTEM, AND INFORMATION PROCESS METHOD

(75) Inventors: Kazuyoshi Ohsawa, Kyoto (JP); Takafumi Masaoka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 520 days.

(21) Appl. No.: 13/036,183

(22) Filed: Feb. 28, 2011

(65) Prior Publication Data

US 2012/0135810 A1 May 31, 2012

(30) Foreign Application Priority Data

Nov. 30, 2010 (JP) ................................. 2010-267079

(51) Int. Cl.
*A63F 9/24* (2006.01)
(52) U.S. Cl.
USPC .................. 463/37; 463/36; 463/38; 463/39; 463/1; 463/47
(58) Field of Classification Search
USPC .......................................... 463/1, 36–39, 47
See application file for complete search history.

(56) References Cited

U.S. PATENT DOCUMENTS

| 8,519,965 B2 * | 8/2013 | Cady et al. ..................... 345/173 |
| 2002/0123380 A1 * | 9/2002 | Hirai et al. ..................... 463/31 |
| 2006/0287088 A1 * | 12/2006 | Mashimo et al. ............... 463/37 |
| 2008/0200223 A1 * | 8/2008 | Maeda et al. ..................... 463/3 |

FOREIGN PATENT DOCUMENTS

JP 2002-282539 10/2002

* cited by examiner

*Primary Examiner* — David L Lewis
*Assistant Examiner* — Chase Leichliter
(74) *Attorney, Agent, or Firm* — Nixon & Vanderhye, P.C.

(57) ABSTRACT

In order to achieve the above objective, a game apparatus determines whether there has been an input to each of an A button and a B button. It is determined whether there has been an input to the other of the A button and the B button before a predetermined time period elapses after a determination that there has been an input to one of the A button and the B button, that is, whether a simultaneous operation has been performed. Then, it is determined whether one of: a first timing which is a timing of the input to the one of the A button and the B button; and a second timing which is a timing of the input to the other of the A button and the B button is within a simultaneous operation period. When a result of the determination is affirmative, and it is determined that the simultaneous operation has been performed, it is determined that the simultaneous operation has been performed at a correct timing.

21 Claims, 16 Drawing Sheets

F I G. 1
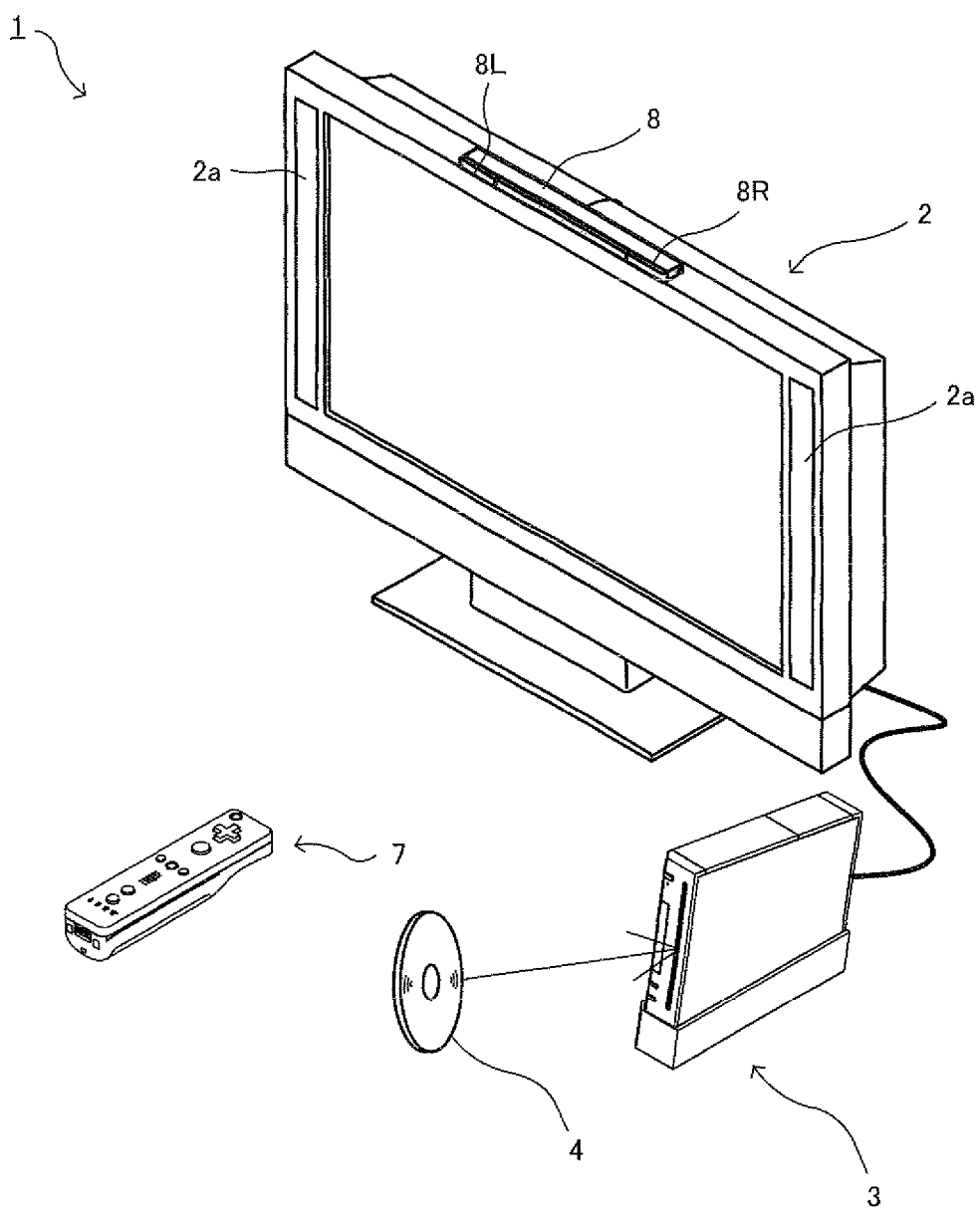

F I G. 4
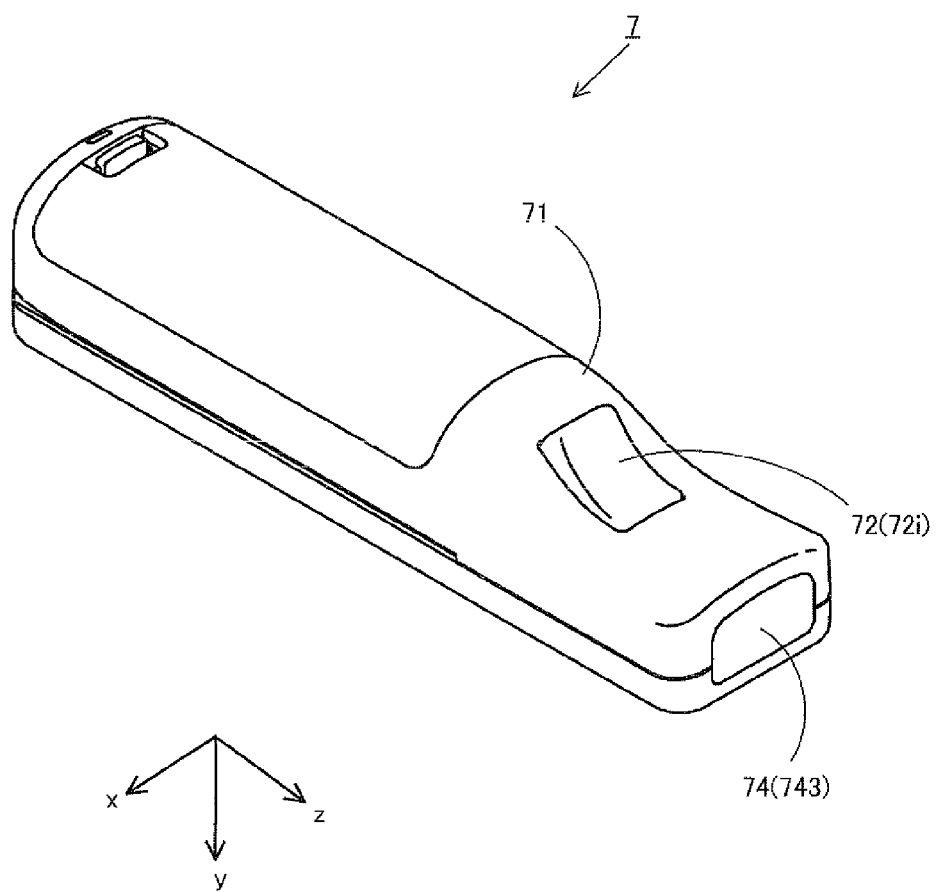

F I G. 7
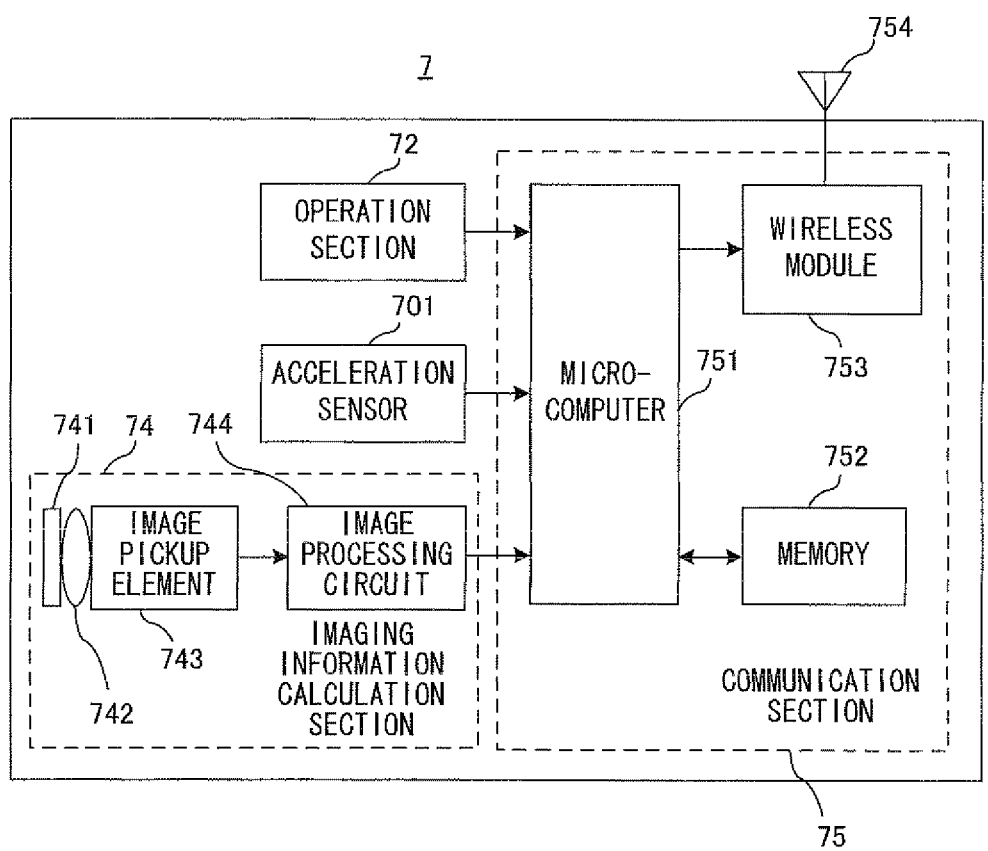

COMPUTER-READABLE STORAGE MEDIUM, INFORMATION PROCESSING APPARATUS, SYSTEM, AND INFORMATION PROCESS METHOD

CROSS REFERENCE TO RELATED APPLICATION

The disclosure of Japanese Patent Application No. 2010-267079, filed on Nov. 30, 2010, is incorporated herein by reference.

BACKGROUND

1. Field

Example embodiments of the present invention relate to a computer-readable storage medium, an information processing apparatus, a system, and an information process method. Example embodiments of the present invention more particularly relate to a computer-readable storage medium, an information processing apparatus, a system, and an information process method, which determine whether there has been an input to first input means and second input means from a user and determine whether the input has been performed at an appropriate input timing.

2. Description of the Background Art

There is a generally known technology in which an information processing apparatus: requires a user to perform simultaneous operation of two operation buttons in a specific time period; and performs a predetermined process only when the simultaneous operation (simultaneous button pressing operation) is successful. For example, Japanese Laid-Open Patent Publication No. 2002-282539 discloses a game apparatus which adopts such a technology. The game apparatus performs music game processing. During the music game processing, the game apparatus requires a user to perform an operation (first simultaneous button pressing operation) of simultaneously pressing an A button and a cross key; and an operation (second simultaneous button pressing operation) of simultaneously pressing a B button and the cross key. Specifically, the game apparatus displays respective instructions for the first simultaneous button pressing operation and the second simultaneous button pressing operation, and determines, when the user has successfully performed the simultaneous button pressing operation within the specific period in accordance with the instruction, that a correct input has been performed.

However, the above described conventional game apparatus requires a user to simultaneously press the A button and the cross key or the B button and the cross key within the specific period (for example, an interval corresponding to a quarter of a measure) in accordance with a display of an instruction for one of the first simultaneous button pressing operation and the second simultaneous button pressing operation. Performing two types of operations simultaneously and both within the specific period can be difficult for a user who is not skilled in the operations, and can be very difficult depending on the type of the operation (such as pressing the cross key downward and simultaneously pressing the A button). In a case where timings of the two types of operations deviate from each other, the user tends to feel that he/she has performed a correct input if one of the two types of operations is performed within the specific period, resulting in a case where it can be determined that a correct input has not been performed even though the user feels that he/she has performed a correct input. Such an inconsistency between how the user feels and the actual input may deteriorate the convenience in input operation.

SUMMARY

Therefore, the objective of example embodiments of the present invention is to provide a computer-readable storage medium, an information processing apparatus, a system, and an information process method which can improve the convenience in the user's input operation.

(1) In order to achieve the above objective, an input determination program stored in a computer-readable storage medium according to an example of one aspect of the present invention causes a computer of an information processing apparatus to determine whether there has been an input to each of first input means and second input means, and causes the computer to function as first determination means, second determination means, and third determination means. The first determination means determines, before a predetermined time period elapses after a determination that there has been an input to one of the first input means and the second input means, whether there has been an input to the other of the first input means and the second input means. The second determination means determines whether one of: a first timing which is a timing of the input to the one of the first input means and the second input means; and a second timing which is a timing of an input to the other of the first input means and the second input means is within a first specific period. The third determination means determines, when a result of the determination by the first determination means and a result of the determination by the second determination means are affirmative, that there have been the inputs to the first input means and the second input means at a correct timing.

As described above, according to the one aspect of the present invention, an input to the first input means and an input to the second input means may not necessarily be simultaneous and a time difference corresponding to a predetermined period time can be determined to be substantially simultaneous. If one of the input to the first input means and the input to the second input means is within the first specific period, it is determined that there have been the inputs to the first determination means and the second determination means at the correct timing. Accordingly, it is not required that both of the input to the first input means and the input to the second input means are within the first specific period. Thus, a user who is not skilled in operation can perform substantially simultaneous inputs to the first input means and the second input means at the correct timing.

(2) In another configuration example, the first specific period may be a time period for requiring substantially simultaneous inputs from the user to both of the first input means and the second input means. According to example embodiments of the present invention, in the first specific period in which the substantially simultaneous inputs to the first input means and the second input means are required, when a time difference between the input to the first input means and the input to the second input means is within a predetermined time period that can be determined to be substantially simultaneous, and one of the inputs is within the first specific period, it is judged that there have been the inputs to the first determination means and the second determination means at the correct timing (an operation has been performed substantially simultaneously and within the first specific period), thereby improving convenience in operation by the user of substantially simultaneous inputs to the first input means and the second input means.

(3) In another configuration example, the second determination means may determine whether the second timing is within the first specific period. According to this configuration, the determination of whether an input timing is within the first specific period is determined by using that of one of: an input to the first input means and an input to the second input means, whichever is later, but not that of the input to the first input means and the input to the second input means, whichever is earlier. Here, if it is determined whether the earlier input timing is within the first specific period, the input timing needs to be stored in the information processing apparatus. Then, when there has been an input before a predetermined time period elapses from the earlier input timing, it has to be determined whether the earlier input timing having been stored is within the first specific period, which makes the determination process complicated. On the other hand, in example embodiments of the present invention, because it is determined whether the latter input timing is within the first specific period, it only has to determine whether this point of time is within the first specific period when there has been an input before the predetermined time elapses after the earlier input timing, thereby allowing simplification of the determination process.

(4) In another configuration example, the input determination program may cause the computer to function as fourth determination means. The fourth determination means may determine, when a period other than the first specific period has come, upon a determination that there has been an input to one of the first input means and the second input means, whether the input has been performed at a correct timing. According to this configuration, in the first specific period, the first determination means determines, before a predetermined time elapses after a determination that there has been the input to the one of the first input determination means and the second input determination means, whether there has been an input to the other of the first input determination means and the second input determination means. Thus, a determination whether an input has been performed at a correct timing is not conducted until there has been the input to the other of the first input determination and the second input determination, or a predetermined time elapses after the input to the one of the first input determination and the second input determination. On the other hand, in a time period other than the first specific period, upon a determination that there has been an input, it is immediately determined whether an input has been performed at a correct timing, thereby allowing the subsequent process to be performed quickly.

(5) In another configuration example, the fourth determination means may determine whether, before the predetermined time period elapses after the determination that there has been the input to the one of the first input means and the second input means, whether the input has been performed at the correct timing. According to this configuration, in a time period other than the first specific period, it is determined whether an input has been performed at a correct timing without waiting until the predetermined time elapses, thereby reducing a time lag corresponding to the predetermined time and allowing the process to be performed quickly.

(6) In another configuration example, the input determination program causes the computer to further function as storing means for causing a storage section connected to the information processing apparatus to store therein timing determination data. Here, the timing determination data is for defining: the first specific period as the time period for requiring substantially simultaneous inputs from the user to both of the first input means and the second input means; a second specific period as a time period for requiring an input from the user to one of the first input means and the second input means; and a third specific period for requiring no input from the user to either the first input means or the second input means. The fourth determination means determines, when it is determined that one of the second specific period and the third specific period has come based on the timing determination data, upon a determination that there has been an input to the one of the first input means and the second input means, whether the input has been performed at a correct timing.

According to the above configuration, in the second specific period and the third specific period, immediately upon a determination that there has been the input to the one of the first input determination means and the second input determination means, it is determined that the input has been performed at the correct timing. Here, in the first specific period, the first determination means determines, before a predetermined time elapses after the determination that there has been the input to the one of the first input determination means and the second input determination means, whether there has been an input to the other of the first input determination means and the second input determination means. Thus, a determination whether an input has been performed at a correct timing is not conducted until there has been an input to the other of the first input determination and the second input determination, or the predetermined time elapses after the input to the one of the first input determination and the second input determination.

On the other hand, in the second specific period, upon a determination that there has been the input to the one of the first input determination means and the second input determination means, it is provisionally determined whether the input has been performed at a correct timing. The result of the determination may be reversed later if there has been an input to the other of the first input determination means and the second input determination means at a timing that can be determined substantially simultaneous with the earlier input. However, it is provisionally determined whether the input has been performed at the correct timing so that the subsequent process can be performed quickly. Further, in the third specific period, any input is determined to be an improper operation, and thus it is immediately determined whether the input has been performed at the correct timing, thereby allowing the subsequent process to be performed quickly.

The second specific period is a time period for requiring an input from the user to one of the first input means and the second input means, however, it may be determined that an input to either the first input means or the second input means is correct, or it may be determined that an input to only one (of the first input means and the second input means) is correct.

(7) In another configuration example, the fourth determination means may include input determination means and cancellation means. Here, the input determination means makes a provisional determination, when it is determined that the second specific period has come based on the timing determination data, upon a determination that there has been an input to one of the first input means and the second input means is in the second specific period, that there has been a correct input. The cancellation means cancels the provisional determination that there has been the correct input, upon a determination that there has been an input to the other of the first input means and the second input means before the predetermined time period elapses after the determination that there has been the input to the one of the first input means and the second input means According to the above configuration, when the second specific period has come, immediately upon the determination that there has been the input to one of the first input means and the second input means, it is provisionally determined that a correct input has been performed. Accordingly, the process subsequent to the determination that the correct input has been performed can be performed quickly. Further, when, before the predetermined time period elapses after the determination that there has been the input to one of the first input means and the second input means, there has been an input to the other of the first input means and the second input means, because both of the inputs are performed at a substantially simultaneous timing by mistake despite an input to only one of the first input means and the second input means is required, the determination that the correct input has been performed is cancelled. Accordingly, it is provisionally determined that a correct input has been performed upon the determination that there has been the input to the one of the first input means and the second input means, and the determination is cancelled upon the determination that there has been the input to the other of the first input means and the second input means at the timing that can be determined to be substantially simultaneous. Consequently, it can be determined that the correct input has been performed upon the determination that there has been the input to the one of the first input means and the second input means, and the subsequent process can be performed immediately. In addition, when it is determined that an incorrect operation of performing an input to the other of the first input means and the second input mean has been performed, the determination that the correct input has been performed is cancelled, thereby preventing the determination that the correct input has been performed from being conclusive despite the incorrect operation has been performed.

When the second specific period is a time period in which an input to either the first input means or the second input means is determined to be correct, it is provisionally determined, upon a determination that there has been an input to one of the first input means and the second input mean, that a correct input has been performed. When the second specific period is a time period in which an input to only one (of the first input means and the second input means) is determined to be correct, it is provisionally determined, upon a determination that there has been an input to the only one of the first input means and the second input means, that a correct input has been performed.

(8) In another configuration example, the input determination program may cause the computer to function as representation process means. Here, the representation process means causes, when the input determination means makes the provisional determination that there has been the correct input, a display section connected to the information processing apparatus to display thereon a first representation in accordance with the correct input. According to this configuration, upon the determination that there has been the input to the one of the first input means and the second input means in the second specific period, the first representation is provided immediately even before the determination that there has been the input to the other of the first input means and the second input means. Thus, the representation can be outputted even before the determination that there has been the input to the other of the first input means and the second input means.

(9) In another configuration example, the representation process means may, when the provisional determination that there has been the correct input is cancelled by the cancellation means, switches from the first representation to a second representation whose content is different from and subsequent to that of the first representation. According to this configuration, when the provisional determination that there has been the correct input is cancelled, the first representation is switched to the second representation. The second representation is a representation whose content is subsequent to that of the first representation. Thus, the content of the second representation is such a content that will not bring a sense of discomfort even when the provisional determination that there has been the correct input is cancelled after the first representation is provided. Further, by determining the content of the second representation so as to indicate that there has been an improper input, the representation indicating that there has been the improper input, which is subsequent to the first representation, is provided upon the determination that there has been the input to the other of the first input means and the second input means.

(10) In another configuration example, the representation process means may, when: the predetermined time period elapses after the determination that there has been the input to the one of the first input means and the second input means; and the provisional determination that the there has been the correct input is not cancelled by the cancellation means, switches from the first representation to a third representation whose content is different from and subsequent to that of the first representation. According to this configuration, when the provisional determination that there has been the correct input is not cancelled and the predetermined time elapses after the input to the one of the first input means and the second input means, that is, when the determination that there has been the correct input becomes conclusive, the first representation is switched to the third representation. The third representation is a representation whose content is subsequent to that of the first representation. Thus, the content of the third presentation is such a content that will not bring a sense of discomfort even when the provisional determination that there has been the correct input is cancelled or becomes conclusive after the first representation is provided. Further, by determining the content of the third representation so as to indicate that there has been the proper input, the following function and an effect are provided. That is, the representation indicating that there has been the proper input, which is subsequent to the first representation, is provided upon the determination that there has been the input to the one of the first input means and the second input means in the second specific period.

(11) In another configuration example, the fourth determination means may determine, when it is determined that the third specific period has come based on the timing determination data, upon a determination that there has been an input to one of the first input means and the second input means, that the input has been performed at an incorrect timing. Accordingly, in the third specific period (a time period in which no input is required to either the first input means or the second input means), an input to either the first input means or the second input means is determined to be an improper operation, and thus it is determined that an input has been performed at an incorrect timing upon a determination that there has been an input in the third specific period.

(12) In another configuration example, the input determination program may cause the computer to function as audio processing means. The audio processing means performs audio processing to output a musical piece from a sound emission section connected to the information processing apparatus. According to this configuration, in accordance with the reproduction of a musical piece, the user is required to perform substantially simultaneous inputs (a time difference of input timings is within a predetermined time) to the first input means and the second input means, and perform an input to one of the first input means and the second input means within the first specific period.

(13) In another configuration example, the input determination program may cause the computer to further function as first specific period determination means. Here the first specific period determination means determines whether the first specific period falls within a predetermined period immediately after the first timing or immediately before and after the first timing. The input determination program causes the computer to function as the first determination means and the second determination means only when a result of the determination by the first specific period determination means is affirmative. According to this configuration, the computer functions as the first determination means and the second determination means only when the first specific period falls within a predetermined period immediately after the first timing or immediately before and after the first timing (one of a timing of an input to one of the first input means and the second input means and a timing of an input to the other of the first input means and the second input means, whichever is earlier). Thus, when the first specific period is not within the predetermined period immediately after the first timing or immediately before and after the first timing, by setting the predetermined time period so that the input to the one of the first input means and the second input means falls within the first specific period, unnecessary processes are eliminated by omitting the determination processes performed by the first determination means and the second determination means.

(14) In order to achieve the above objective, an information processing apparatus according to an example of one aspect of the present invention is an information processing apparatus for determining whether there has been an input to each of first input means and second input means, and includes first determination means, second determination means, and third determination means. The first determination means determines, before a predetermined time period elapses after a determination that there has been an input to one of the first input means and the second input means, whether there has been an input to the other of the first input means and the second input means. The second determination means determines whether one of: a first timing which is a timing of the input to the one of the first input means and the second input means; and a second timing which is a timing of an input to the other of the first input means and the second input means is within a first specific period. The third determination means determines, when a result of the determination by the first determination means and a result of the determination by the second determination means are affirmative, that there have been the inputs to the first input means and the second input means at a correct timing.

(15) In order to achieve the above objective, a system according to an example of one aspect of the present invention is a system for determining whether there has been an input to each of first input means and second input means, and includes first determination means, second determination means, and third determination means. The first determination means determines, before a predetermined time period elapses after a determination that there has been an input to one of the first input means and the second input means, whether there has been an input to the other of the first input means and the second input means. The second determination means determines whether one of: a first timing which is a timing of the input to the one of the first input means and the second input means; and a second timing which is a timing of an input to the other of the first input means and the second input means is within a first specific period. The third determination means determines, when a result of the determination by the first determination means and a result of the determination by the second determination means are affirmative, that there have been the inputs to the first input means and the second input means at a correct timing.

(16) In order to achieve the above objective, an information process method according to an example of one aspect of the present invention includes an input determination step, a first determination step, a second determination step, and a third determination step. Here, in the input determination step, it is determined whether there has been an input to each of the first input means and the second input means. The first determination means determines, before a predetermined time period elapses after the determination that there has been the input to one of the first input means and the second input means, whether there has been an input to the other of the first input means and the second input means. The second determination means determines whether one of: a first timing which is a timing of the input to the one of the first input means and the second input means; and a second timing which is a timing of an input to the other of the first input means and the second input means is within a first specific period. The third determination means determines, when a result of the determination by the first determination means and a result of the determination by the second determination means are affirmative, that there have been the inputs to the first means and the second input means at a correct timing.

The information processing apparatus, the system, and the information process method of the above (14) to (16), provide the same functions and effects as those of the computer of (1).

According to example embodiments of the present invention, an input to the first input means and an input to the second input means may not necessarily be simultaneous and a time difference corresponding to a predetermined period time can be determined to be substantially simultaneous. If one of an input to the first input means and an input to the second input means is within the first specific period, it is determined that there have been the inputs to the first determination means and the second determination means at a correct timing. Accordingly, it is not required that both of the input to the first input means and the input to the second input means are within the first specific period. Thus, a user who is not skilled in operation can perform a substantially simultaneous input to each of the first input means and the second input means at the correct timing. When the user performs one of the two types of operations (an input to each of the first input means input and the second input means) within the first specific period, the user tends to feel that he/she has performed an input at the correct timing, however, such an inconsistency between how the user feels and the actual input can be eliminated and the convenience in the user's input operation can be improved.

These and other objects, features, aspects and advantages of example embodiments or the present invention will become more apparent from the following detailed description of example embodiments of the present invention when taken in conjunction with the accompanying drawings.

BRIEF DESCRIPTION OF THE DRAWINGS

FIG. 1 is an external view of a game system.

FIG. 4 is a perspective view of the controller seen from a bottom front side thereof;

FIG. 7 is a block diagram illustrating a configuration of the controller;

Figure 2:
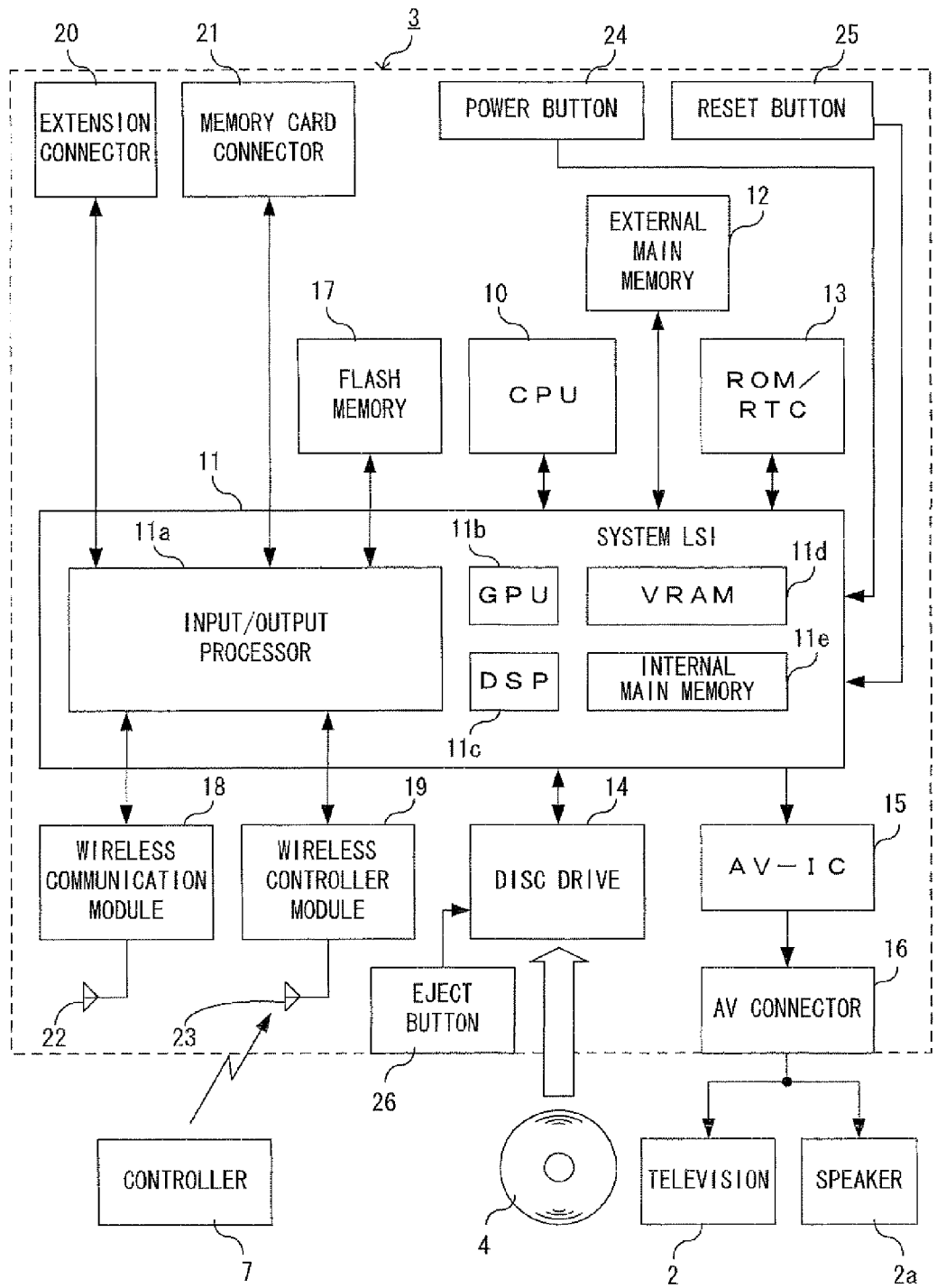
FIG. 2 is a block diagram illustrating a configuration of the game apparatus.

DESCRIPTION OF THE EXAMPLE EMBODIMENTS (Overall Configuration of Game System)

Referring to FIG. 1, a game system 1 including a game apparatus according to the embodiment of the present invention will be described. FIG. 1 is an external view of the game system 1. Hereinafter, the game apparatus and a game program of the present embodiment will be described using a stationary game apparatus as an example. As shown in FIG. 1, the game system 1 includes a television receiver (hereinafter, referred to merely as a television) 2, a game apparatus 3, and the optical disc 4, a controller 7, and a marker section 8. The game system 1 executes game processing on the game apparatus 3 in accordance with a game operation using the controller 7.

The optical disc 4, which is an example of an exchangeable information storage medium replaceably used with respect to the game apparatus 3, is detachably inserted in the game apparatus 3. The optical disc 4 stores a game program which is to be executed by the game apparatus 3. The game apparatus 3 has an insertion slot for the optical disc 4 at its front surface. The game apparatus 3 reads and executes the game program stored in the optical disc 4 which is inserted in the insertion slot, thereby executing the game processing.

The television 2, which is an example of a display device, is connected to the game apparatus 3 via a connection cord. The television 2 displays on a screen thereof game images which are obtained as the result of the game processing executed by the game apparatus 3; and concurrently outputs audio relating to a game from two loudspeakers 2a. The marker section 8 is mounted adjacent to (on the upper surface of the screen in FIG. 1) the screen of the television 2. The marker section 8 has a marker 8R and a marker 8L at its opposite ends, respectively. The marker 8R has one or more infrared LEDs which output infrared lights forward from the television 2. The marker SL has the same configuration as the marker 8R. The marker section 8 is connected to the game apparatus 3, and the game apparatus 3 is capable of controlling illumination of each infrared LED of the marker section 8.

The controller 7 is an input device which provides the game apparatus 3 with operation data which indicates contents of an operation made to the controller 7. The controller 7 is connected to the game apparatus 3 by wireless communication. In the present embodiment, the technology of, for example, Bluetooth (registered trademark) is used for the wireless communication between the controller 7 and the game apparatus 3. It is noted that in an alternative embodiment, the controller 7 may be connected to the game apparatus 3 via a wire.

(Internal Configuration of Game Apparatus 3)

The following will describe an internal configuration of the game apparatus 3 with reference to FIG. 2. FIG. 2 is a block diagram illustrating a configuration of the game apparatus 3. The game apparatus 3 includes a CPU 10, a system LSI 11 an external main memory 12, a ROM/RTC 13, a disc drive 14, an AV-IC 15, and the like.

The CPU 10 executes the game processing (for example, music game processing) by executing the game program (for example, a music game program) stored in the optical disc 4, and functions as a game processor. The CPU 10 is connected to the system LSI 11. In addition, the external main memory 12, the ROM/RTC 13, the disc drive 14, and the AV-IC 15 are connected to the system LSI 11. The system LSI 11 performs processing such as control of data transfer between the system LSI 11 and each component connected to the system LSI 11, generation of an image to be displayed, obtaining data from an external device, and the like. An internal configuration of the system LSI 11 will be described later. The volatile external main memory 12 stores a program such as the game program read from the optical disc 4, a game program read from a flash memory 17, and the like, and various data, and is used as a work area and a buffer area for the CPU 10. The ROM/RTC 13 includes a ROM (so-called boot ROM) which stores a program for starting up the game apparatus 3, and a clock circuit (RTC: Real Time Clock) for counting time. The disc drive 14 reads program data, texture data, and the like from the optical disc 4, and writes these data into an internal main memory lie, which will be described below, or the external main memory 12.

The system. LSI 11 is provided with an input-output processor (an I/O processor) 11a, a GPU (Graphics Processor Unit) 11b, a DSP (Digital Signal Processor) 11c, a VRAM 11d, and the internal main memory 11e. Although not shown in the drawings, these components 11a to 11e are connected to each other via an internal bus.

The GPU 11b forms a part of drawing means, and generates an image according to a graphics command (command for generating graphics) from the CPU 10. More specifically, the GPU 11b performs computing processing required for displaying 3D graphics, for example, performs processing of coordinate conversion from 3D coordinates into 2D coordinates which is performed prior to rendering, and finally, processing of rendering such as attaching texture, thereby generating game image data. In addition to the graphics command, the CPU 10 provides the GPU 11b with an image generation program required for generating the game image data. The VRAM 11d stores data, such as polygon data and texture data, which are required for the GPU 11b to execute the graphics command. In generating an image, the GPU 11d creates the image data using the data stored in the VRAM 11d.

The DSP 11c functions as an audio processor, and generates audio data using sound data and sound waveform (tone color) data which are stored in the internal main memory 11e and the external main memory 12. Further, the DSP 11c performs a process of decoding (reproducing) the inputted audio data. Like the external main memory 12, the internal main memory lie stores a program and various data, and is used as a work area and a buffer area for the CPU 10.

The image data and the audio data generated thus are read by the AV-IC 15. The AV-IC 15 outputs the image data to the television 2 via an AV connector 16, and the audio data to speakers 2a built in the television 2. Thus, an image is displayed on the television 2, and sound is outputted from the speakers 2a.

The input/output processor 11a performs transmission and reception of data to and from each component connected to the input/output processor 11a, and downloads data from an external device. The input/output processor 11a is connected to the flash memory 17, a wireless communication module 18A wireless controller module 19, an extension connector 20, and a memory card connector 21. An antenna 22 is connected to the wireless communication module 18 And an antenna 23 to the wireless controller module 19.

The input/output processor 11a is connected to a network via the wireless communication module 18 And the antenna 22, so that the input/output processor 11a is communicable with another game apparatus connected to the network and various servers connected to the network. The input/output processor 11a periodically accesses the flash memory 17 to detect whether there are data required to be transmitted to the network. If there are such data, the input/output processor 11a transmits the data to the network via the wireless communication module 18 And the antenna 22. The input/output processor 11a receives data transmitted from the other game apparatus and data downloaded from a download server via the network, the antenna 22, and the wireless communication module 18 And stores the received data in the flash memory 17. The CPU 10 reads out the data stored in the flash memory 17 by executing the game program, and uses the data in the game program. In addition to the data transmitted or received between the game apparatus 3 and the other game apparatus or various servers, the flash memory 17 may store saved data (result data or midstream data of the game) of the game played using the game apparatus 3.

The input/output processor 11a receives operation data transmitted from the controller 7, via the antenna 23 and the wireless controller module 19, and stores (temporarily stores) the operation data in the buffer area of the internal main memory 11e or the external main memory 12.

In addition, the extension connector 20 and the memory card connector 21 are connected to the input/output processor 11a. The extension connector 20 is a connector for an interface such as USB and SCSI, and the communication with the network is enabled by connecting a medium such as an external storage medium, a peripheral device such as another controller, or a wired connector for communication to the extension connector 20 instead of the wireless communication module 18. The memory card connector 21 is a connector for connecting thereto an external storage medium such as a memory card. For example, the input/output processor 11a accesses the external storage medium via the extension connector 20 and the memory card connector 21, thereby saving data in the external storage medium and reading data from the external storage medium.

The game apparatus 3 is provided with a power button 24, a reset button 25, and an eject button 26. The power button 24 and the reset button 25 are connected to the system LSI 11. When the power button 24 is turned on, electric power is supplied to each component of the game apparatus 3 via an AC adaptor (not shown). In the state where the power has been turned on, if the power button 24 is pressed, the game apparatus 3 shifts to a low power standby mode. Even in the low power standby mode, electric power is supplied to the game apparatus 3. Because electric power is always supplied to the game apparatus 3, the game apparatus 3 can be always connected to a network such as the Internet even in this state. For turning off the power after the power is turned on, the power button 24 is pressed for a predetermined time period or longer. The reset button 25 is pressed to cause the system LSI 11 to restart a boot program of the game apparatus 3. The eject button 26 is connected to the disc drive 14. The eject button 26 is pressed to eject the optical disc 4 from the disc drive 14.

Figure 3:
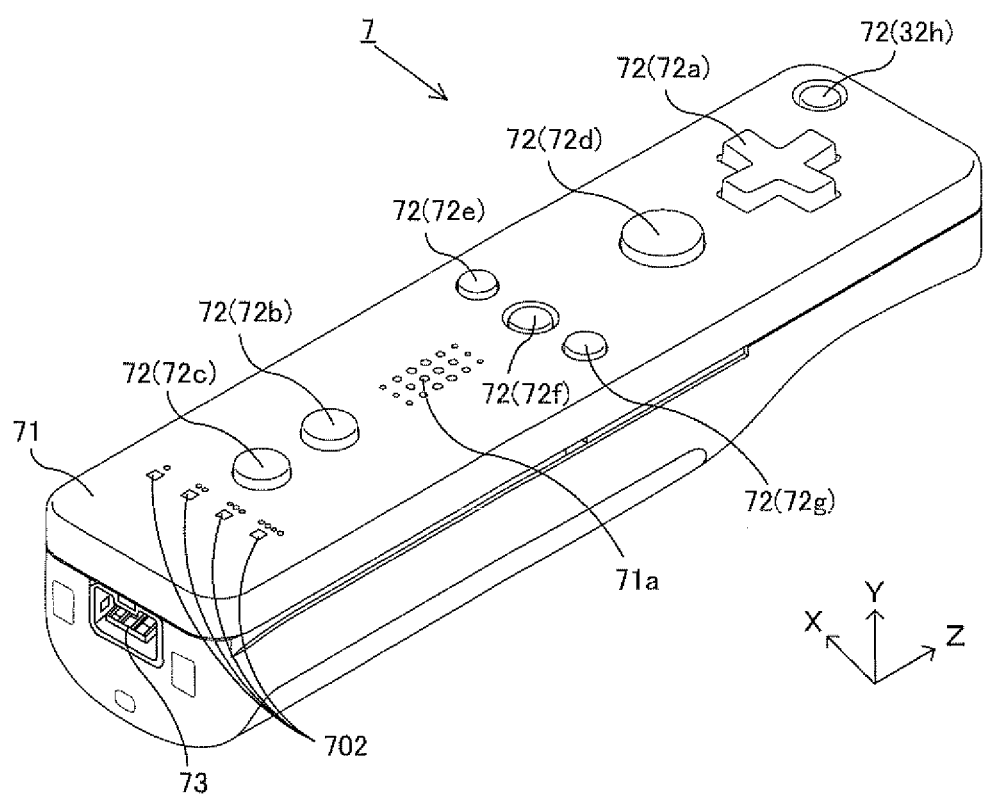
FIG. 3 is a perspective view of a controller seen from a top rear side thereof.

Next, the controller 7 will be described with reference to FIGS. 3 and 4. FIG. 3 is a perspective view of the controller 7 seen from a top rear side thereof, and FIG. 4 is a perspective view of the controller 7 seen from a bottom front side thereof.

As shown in FIGS. 3 and 4, the controller 7 includes a housing 71 and an operation section 72 (72a to 72i) including a plurality of operation buttons which are provided on surfaces of the housing 71. The housing 71 of the present embodiment has a generally parallelepiped shape extending in a longitudinal direction from front to rear. The overall size of the housing 71 is small enough to be held by one hand of an adult or even a child, and, for example, the housing 71 is formed by plastic molding.

At the center of a front part of a top surface of the housing 71, a cross key 72a is provided. The cross key 72a is a cross-shaped four-direction push switch. The cross key 72a includes operation portions corresponding to four directions (front, rear, right and left), which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, select an option from a plurality of options (for example, a plurality of musical pieces).

The cross key 72a is an operation section for outputting an operation signal in accordance with the above-described direction input operation performed by the player. Such an operation section may be provided in another form. For example, the cross key 72a may be replaced with an operation section which includes four push switches arranged in a square and which outputs an operation signal in accordance with the push button pressed by the player. In addition to the four push switches of the operation section, a center switch may be provided at the center of the four push switches to form a composite operation section including the four push switches and the center switch. Alternatively, the cross key 72a may be replaced with an operation section which includes an inclinable stick (or joystick) projecting from a top surface of the housing 71 and which outputs an operation signal in accordance with an inclining direction of the stick. Still alternatively, the cross key 72a may be replaced with an operation section which includes a disc-shaped and horizontally slidable member and which outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are operation sections for, when the player presses a head thereof, outputting the corresponding operation signals. For example, functions as a number one button, a number two button and an A button are assigned to the operation buttons 72b to 72d, respectively. Hereinafter, the operation button 72d will be referred to as a "A button 72d." Also, functions as a minus button, a home button, and a plus button are assigned to the operation buttons 72e to 72g, respectively. Operation functions are assigned to the operation buttons 72b to 72g in accordance with the game program executed by the game apparatus 3. In an exemplary arrangement shown in FIG. 3, the operation buttons 72b to 72d are arranged in a line at the center in a front-rear direction on the top surface of the housing 71. The operation buttons 72e to 72g are arranged on the top surface of the housing 71 in a line in a left-right direction between the operation buttons 72b and 72c1. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the game apparatus 3 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. Here, a controller type (number) is assigned to the controller 7 such that the controller 7 is distinguishable from the other controllers 7. The LEDs 702 are used for, for example, informing the player of the controller type which is currently set for the controller 7. More specifically, when the controller 7 transmits transmission data to the game apparatus 3, one of the plurality of LEDs 702 which corresponds to the controller type of the controller 7 is lit up.

On the top surface of the housing 71, a plurality of holes are provided between the operation button 72b and the operation buttons 72e to 72g for emitting sound from a speaker (a speaker 706 in FIG. 5), which will be described later, to the outside therethrough.

On a bottom surface of the housing 71, a recessed portion is formed. As described later in detail, the recessed portion is formed in a position in which an index finger or middle finger of the player is located when the player holds the controller 7 with one hand such that the front surface thereof faces the makers 8L and 8R. On a slope surface of the recessed portion, an operation button 72i is provided. The operation button 72i is an operation section functioning as, for example, a B button. Hereinafter, the operation button 72i will be referred to as a "B button 72i."

On a front surface of the housing 71, an image pickup element 743 constituting a part of an imaging information calculation section 74 is provided. The imaging information calculation section 74 is a system for analyzing image data of an image taken by the controller 7, thereby identifying an area having a high brightness in the image and detecting a position of a center of gravity, a size and the like of the area. The imaging information calculation section 74 has, for example, a maximum sampling period of about 200 frames/sec, and therefore can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for engaging and connecting the controller 7 with a connection cable.

For giving a more specific description, a coordinate system set with respect to the controller 7 will be defined. As shown in FIGS. 3 and 4, mutually perpendicular x-axis, y-axis, and z-axis are defined with respect to the controller 7. More specifically, the longitudinal direction of the housing 71 or the front-rear direction of the controller 7 corresponds to z-axis, and the direction toward the front surface of the controller 7 (the surface in which the imaging information calculation section 74 is provided) is a positive direction of z-axis. The up-down direction of the controller 7 corresponds to y-axis, and the direction toward the top surface of the housing 71 (the surface on which the operation button 72a and the like are provided) is a positive direction of y-axis. The left-right direction of the controller 7 corresponds to x-axis, and the direction toward the right side surface of the housing 71 (the side surface which is not shown in FIG. 3 but shown in FIG. 4) is a positive direction of x-axis.

Figure 5:
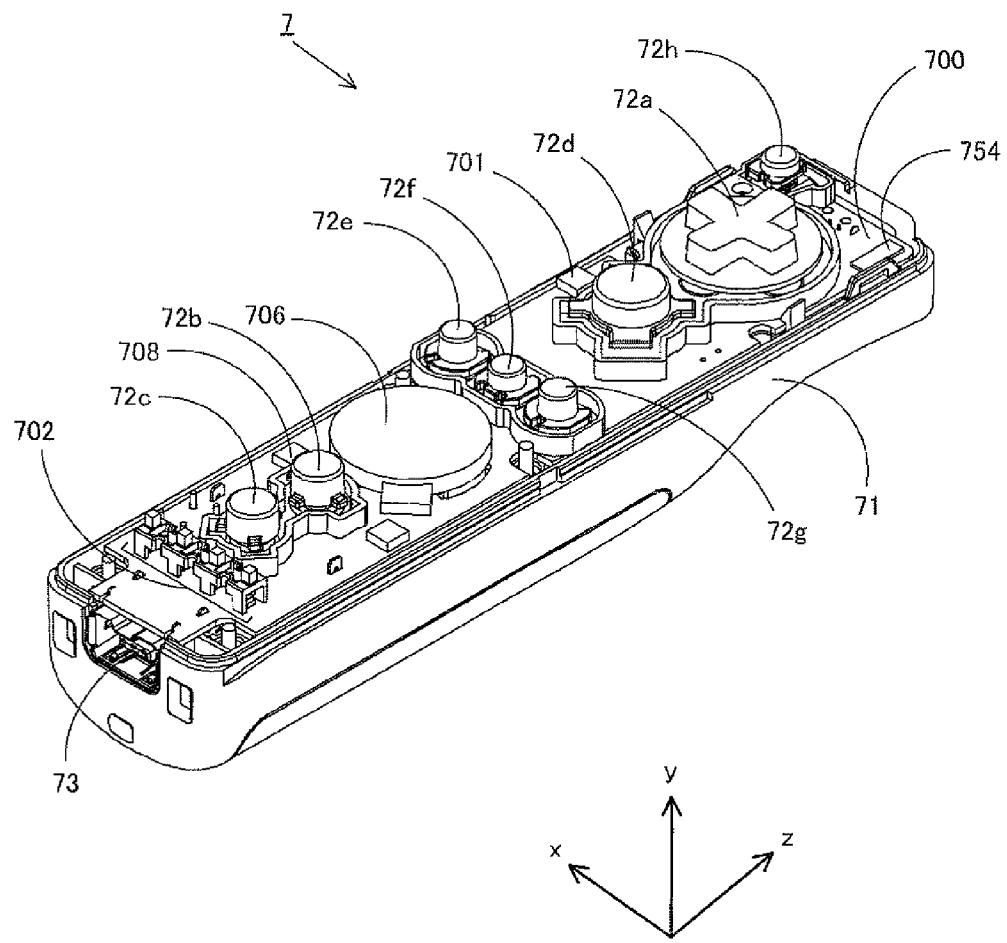
FIG. 5 is a perspective view of the controller seen from a back side, the controller being in a state where an upper housing of the controller is removed.
Figure 6:
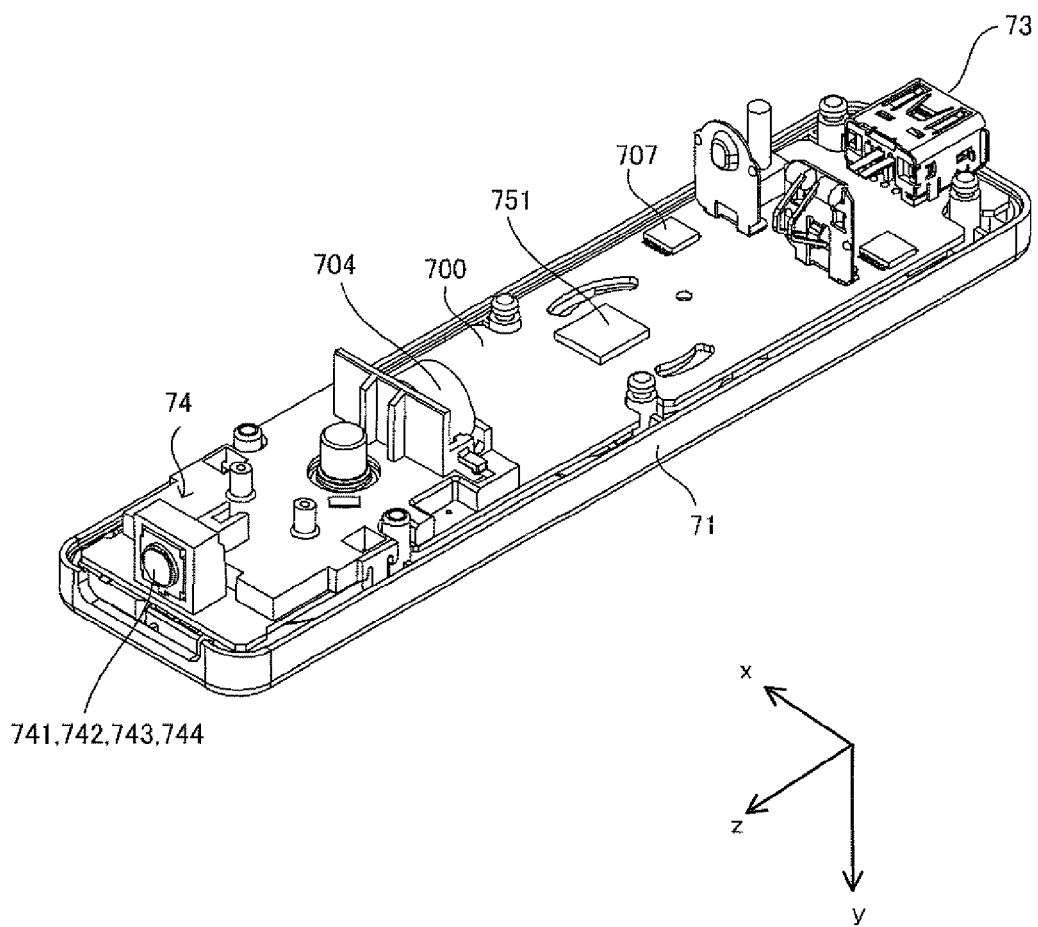
FIG. 6 is a perspective view of the controller seen from a front side, the controller being in a state where a lower housing of the controller is removed.

The following will describe an internal structure of the controller 7 with reference to FIGS. 5 and 6. FIG. 5 is a perspective view showing a state where an upper housing (a part of the housing 71) of the controller 7 is removed as seen from a rear side thereof. FIG. 6 is a perspective view showing a state where a lower housing (a part of the housing 71) of the controller 7 is removed as seen from a front side thereof. FIG. 6 shows a reverse side of a substrate 700 shown in FIG. 5.

As shown in FIG. 5, the substrate 700 is fixed inside the housing 71. On a top main surface of the substrate 700, the operation buttons 72a to 72h, an acceleration sensor 701, the LEDs 702, and an antenna 754 and the like are provided. These components are connected to a microcomputer 751 and the like (see FIGS. 6 and 7) by lines (not shown) formed on the substrate 700 and the like. The microcomputer 751 functions to generate operation data in accordance with a type of the operation button 72a and the like. This function is a known technique, and achieved, for example, by the microcomputer 751 detecting contact/non-contact of the line by a switch mechanism such as a tact switch located below a keytop. More specifically, for example, the operation button is pressed to contact with the line, thereby conducting a current therethrough. The microcomputer 751 detects which operation button the line in which the current conduction occurs leads to, and generates a signal in accordance with a type of the operation button.

The controller 7 functions as a wireless controller by a wireless module 753 (see FIG. 7) and the antenna 754. In the housing 71, a crystal oscillator (not shown) is provided for generating a basic clock of the microcomputer 751, which will be described later. On the top main surface of the substrate 700, the speaker 706 and an amplifier 708 are provided. The acceleration sensor 701 is provided on the left side of the operation button 72d on the substrate 700 (i.e. on the periphery of the substrate 700, not on the center thereof). The acceleration sensor 701 is capable of detecting acceleration included in a component caused by a centrifugal force in accordance with rotation of the controller 7 about the longitudinal direction thereof, in addition to change of direction of gravitational acceleration. Thus, the game apparatus 3 or the like can be sensitive enough to determine the rotation of the controller 7 from detected acceleration data using a predetermined calculation.

As shown in FIG. 6, at a front edge of a bottom main surface of the substrate 700, the imaging information calculation section 74 is provided. The imaging information calculation section 74 includes an infrared filter 741, a lens 742, the image pickup element 743, and an image processing circuit 744 which are located in this order from the front surface of the controller 7. These components are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 by lines formed on the substrate 700 and the like, and outputs a sound signal to the speaker 706 via the amplifier 708 in accordance with the sound data transmitted from the game apparatus 3.

On the bottom main surface of the substrate 700, a vibrator 704 is attached. The vibrator 704 is, for example, a vibration motor or a solenoid. The vibrator 704 is connected to the microcomputer 751 by a line formed on the substrate 700 and the like, and actuated or unactuated in accordance with vibration data transmitted from the game apparatus 3. The controller 7 is vibrated by an actuation of the vibrator 704, and the vibration is conveyed to the player holding the controller 7. Thus, a so-called vibration-feedback game is realized. Because the vibrator 704 is located in the front portion of the housing 71, the housing 71 is vibrated substantially, and hence the player holding the controller 7 easily feels the vibration.

The following will describe an internal constitution of the controller 7 with reference to FIG. 7. FIG. 7 is a block diagram illustrating an internal configuration of the controller 7.

As shown in FIG. 7, the controller 7 includes therein a communication section 75 in addition to the operation section 72, the imaging information calculation section 74, the acceleration sensor 701, the vibrator 704, the speaker 706, the sound IC 707, and the amplifier 708.

It is noted that the vibrator 704, the speaker 706, the sound IC 707, and the amplifier 708 Are not shown in FIG. 7.

The imaging information calculation section 74 includes the infrared filter 741, the lens 742, the image pickup element 743, and the image processing circuit 744. The infrared filter 741 allows, among lights incident on the front surface of the controller 7, only an infrared light to pass therethrough. The lens 742 converges the infrared light which has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light which has passed through the infrared filter 741. Then, the image pickup element 743 generates image data of the image. The image data generated by the image pickup element 743 is processed by the image processing circuit 744. More specifically, the image processing circuit 744 processes the image data obtained from the image pickup element 743, detects an area of the image which has a high brightness, and outputs, to the communication section 75, process result data indicating the result of calculation of position coordinates and a square measure of the area. The imaging information calculation section 74 is fixed to the housing 71 of the controller 7. An imaging direction of the imaging information calculation section 74 can be changed by changing a facing direction of the housing 71. A signal in response to the position and the motion of the core unit 70 can be obtained based on the processing result data outputted from this imaging information calculation section 74.

The controller 7 preferably includes a three-axis (x-axis, y-axis, and z-axis) acceleration sensor 701. The three-axis acceleration sensor 701 detects linear acceleration in three directions, i.e., an up-down direction, a left-right direction, and a front-rear direction. In an alternative embodiment, a two-axis accelerometer which detects only linear acceleration along each of the up-down direction and the left-right direction (the other pair of directions) may be used depending on the type of control signals used in the game processing. As a non-limiting example, the two-axis or three-axis acceleration sensor 701 may be of the type available from Analog Devices, Inc. or STMicroelectronics N.V. Preferably, the acceleration sensor 701 may be of electrostatic capacitance or capacitance-coupling type which is based on silicon micromachined MEMS (microelectromechanical systems) technology. However, any other suitable accelerometer technology (e.g., piezoelectric type or piezoresistance type) now existing or later developed may be used to provide the two-axis or three-axis acceleration sensor 701.

The communication section 75 includes the microcomputer 751, a memory 752, the wireless module 753, and the antenna 754. The microcomputer 751 controls the wireless module 753 for wirelessly transmitting the transmission data while using the memory 752 as a storage area during processing. The microcomputer 751 controls the operations of the sound IC 707 and the vibrator 704 in accordance with the data which the wireless module 753 receives from the game apparatus 3 via the antenna 754. The sound IC 707 processes the sound data and the like transmitted from the game apparatus 3 via the communication section 75. The microcomputer 751 actuates the vibrator 704 in accordance with the vibration data (e.g. a signal for actuating or unactuating the vibrator 704) transmitted from the game apparatus 3 via the communication section 75.

Data from the controller 7 including an operation signal (key data) from the operation section 72, acceleration signals (acceleration data of directions of x-axis, y-axis, and z-axis which is hereinafter referred to merely as acceleration data) from the acceleration sensor 701, and the processing result data from the imaging information calculation section 74, are outputted to the microcomputer 751. The microcomputer 751 temporarily stores the operation data (the key data, the acceleration data, and the processing result data) in the memory 752 as the transmission data which is to be transmitted to the wireless controller module 19. The wireless transmission from the communication section 75 to the wireless controller module 19 is performed periodically at a predetermined time interval. Because game processing is generally performed at a cycle of 1/60 sec., data needs to be transmitted at a cycle of a shorter time period. Specifically, the game processing unit is 16.7 ms (1/60 sec.), and the transmission interval of the communication section 75 structured using the Bluetooth (registered trademark) technology is 5 ms. At the transmission timing to the wireless controller module 19, the microcomputer 751 outputs the transmission data stored in the memory 752 as a series of operation information to the wireless module 753. The wireless module 753 uses, for example, the Bluetooth (registered trademark) technology to modulate the operation data onto a carrier wave of a predetermined frequency and to radiate the resultant radio signal from the antenna 754. Thus, the key data from the operation section 72 provided in the controller 7, the acceleration data from the acceleration sensor 701, and the processing result data from the imaging information calculation section 74 are modulated into the radio signal by the wireless module 753 and transmitted from the controller 7. The wireless controller module 19 of the game apparatus 3 receives the radio signal, and the game apparatus 3 demodulates or decodes the radio signal to obtain the operation data, that is, the series of operation information (the key data, the acceleration data, and the processing result data). Based on the obtained operation information and the game program, the CPU 10 of the game apparatus 3 performs the game processing. In the case where the communication section 75 is structured using the Bluetooth (registered trademark) technology, the communication section 75 can have a function of receiving transmission data which is wirelessly transmitted from another device.

(Music Game Processing)

In the following, the music game processing which is a feature of the present embodiment will be described. In the music game processing, the user is required to perform one of an operation (hereinafter referred to as a "single operation") of pressing one specified operation button 72 among the above described operation buttons 72; and an operation (hereinafter referred to as a "simultaneous operation") of substantially simultaneously (a time difference corresponding to several frames is allowed as substantially simultaneous) pressing two specified operation buttons 72 among the above described operation buttons 72. Specifically, in the music game processing, a process (an operation instruction determination process) is performed so that an operation instruction for one of the single operation and the simultaneous operation is displayed on the television 2 in accordance with reproduction of a musical piece. Then, in the music game processing, it is determined whether the user has correctly performed one of the single operation and the simultaneous operation in accordance with the operation instruction, and a process (an operation type determination process) for providing a representation based on a result of the determination is performed.

In the present embodiment, an A button 72$d$ is the operation button 72 for the single operation, and the A button 72$d$ and a B button 72$i$ are the operation buttons 72 for the simultaneous operation. However, any operation button 72 other than the A button 72$d$ may be assigned as the operation button 72 for the single operation and the operation button 72 for the simultaneous operation.

Figure 8A:
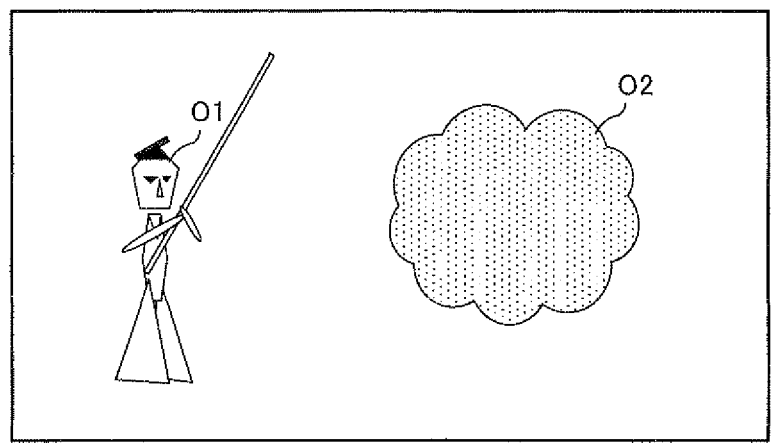
FIG. 8A shows an example of a game image displayed through an operation instruction determination process.
Figure 8B:
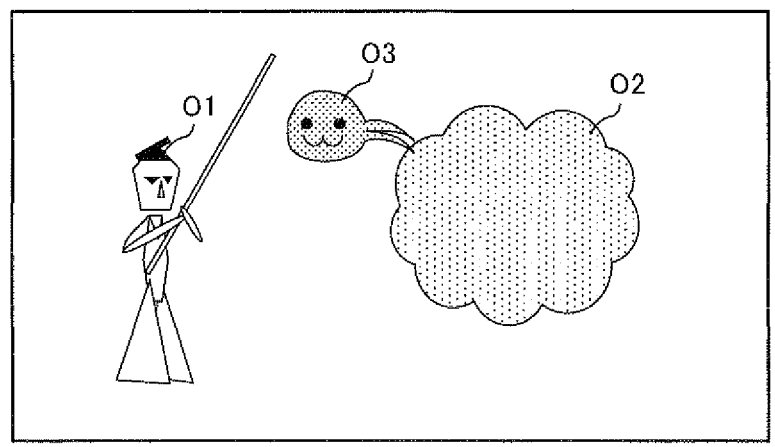
FIG. 8B shows an example of the game image displayed through the operation instruction determination process.

In the following, with reference to FIGS. 8A and 813, a game image which is displayed on a screen of the television 2 by the game apparatus 3 performing the operation instruction determination process will be described. FIGS. 8A and 8B respectively show examples of the game image displayed through the operation instruction determination process. With reference to FIG. 8A, on a game image in FIG. 8A, for example, a reference object O1 representing a samurai character and a black-cloud object O2 are displayed. The reference object O1 is arranged in a predetermined position (a position on the leftward side in this example) of the game image and performs an attack action which is a representation using a sword in accordance with the user's operation. The detail of the attack action will be described later with reference to FIGS. 12 to 14.

Then, as shown in FIG. 5B, when an operation timing at which the user is required to perform the operation is close, for example, an instruction object O3 representing a ghost character is sequentially displayed in accordance with the reproduction of the musical piece such that the instruction object O3 appears from the lack-cloud object O2. The instruction object O3 is erased after being displayed at a position where the instruction object O3 can be struck with the sword of the reference object O1. By pressing the operation buttons 72 when the instruction object O3 is at the position (when the instruction object O3 is displayed as shown in FIG. 8B), it is determined that the operation has been performed at a proper operation timing. Accordingly, the user is informed of the operation timing by the display of the instruction object O3. There are, for example, two types of the instruction object O3 which are displayed in different colors, shapes, and the like. Based on the type of the instruction object O3, the user is instructed which one of the simultaneous operation and the single operation the user should perform. The instruction object O3 indicating an instruction for the simultaneous operation may be referred to as a "simultaneous operation instruction object O3$a$." The instruction object O3 indicating an instruction for the single operation may be referred to as a "single operation instruction object O3$b$."

The above described game images are mere examples, and any type of game image may be displayed as long as the user can be informed of a timing for each of the single operation and the simultaneous operation. Further, instead of displaying a game image, the user may be informed of the timing of each of the operations by using any other method such as outputting audio.

Figure 9:
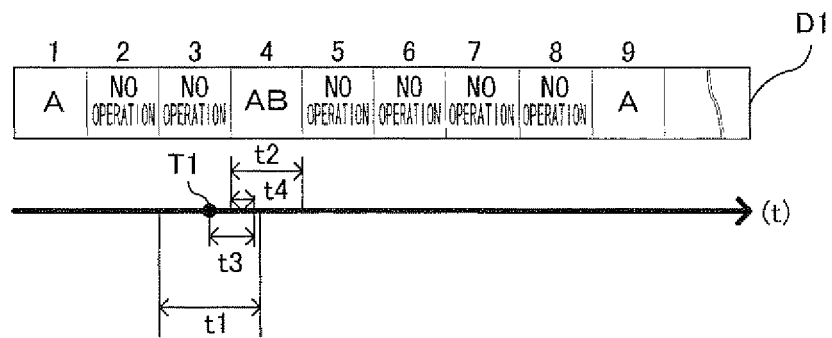
FIG. 9 is diagram illustrating a determination method of a simultaneous operation.
Figure 10:
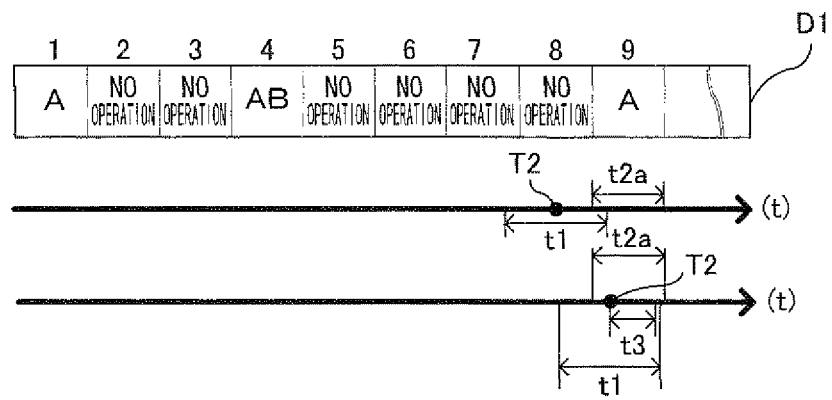
FIG. 10 is a diagram illustrating a determination method of a single operation.
Figure 11:
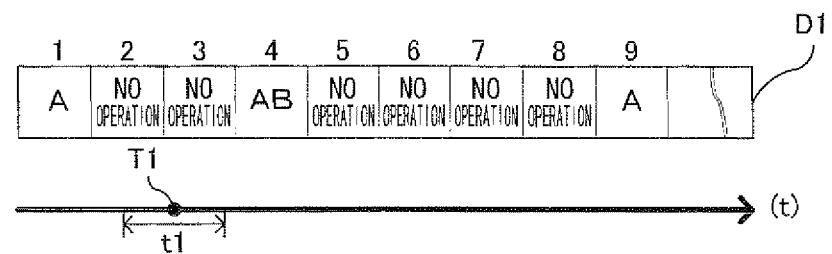
FIG. 11 is a diagram illustrating a method for determining that an improper operation has been performed at a time period in which "no operation" is judged to be correct.

Next, a method used in an operation determination process for determining whether the user's operation is correct will be described with reference to FIGS. 9 to 11. FIG. 9 is a diagram illustrating a determination method of the simultaneous operation. FIG. 10 is a diagram illustrating a determination method of the single operation. FIG. 11 is a diagram illustrating a method for determining that an improper operation has been performed at a timing at which "no operation" is judged to be correct.

In the music game processing, during a musical piece reproduction period, an operation which the user is required to perform is switched at regular intervals (for example, every period of one beat). Specifically, in FIGS. 9 to 11$a$, required operation data D1 (corresponds to an example of "timing instruction data" of the present invention) is shown in an upper part of each of the diagrams. The required operation data D1 is data indicating an operation which the user is required to perform at each of the regular intervals after reproduction start of the musical piece. Then, the game apparatus 3 provides an instruction indicating an operation type which the user is required to perform at each of the regular intervals based on the operation data D1 (provides an instruction by such as displaying the instruction object O3 as shown in FIG. 8B). Accordingly, the game apparatus 3 determines whether a proper operation has been performed depending on whether an operation coincides with the operation type required to perform has been performed within one of the regular intervals.

In the following, a method for determining whether a proper operation has been performed will be described in detail. Specifically, sequential numbers (1 to 9 in FIGS. 9 to 11) are allocated to each of the regular intervals during a period from reproduction start of the musical piece and reproduction end of the musical piece, and the required operation data D1 indicates operation types corresponding to the numbers (the regular intervals), respectively. In the example of FIGS. 9 to 11, "A," "AB," "none" indicate the single operation, the simultaneous operation, and no operation, respectively. In the example, the required operation data D1 indicates the single operation in association with the number 1 (corresponds to a period of the first beat, for example), "no operation" in association with the numbers 2 and 3 (respectively correspond to a period of the second beat and a period of the third beat), and the simultaneous operation in association with the number 4 (corresponds to a period of the fourth beat, for example). Accordingly, "the single operation" is required to be performed from the reproduction start of the musical piece until a predetermined period elapses (the period of the first beat elapses). Then, until another predetermined period elapses (the period of the second beat elapses), "no operation" is required to be performed, and until still another predetermined period elapses (the period of the third beat elapses), "no operation" is required to be performed. Then, until a yet another predetermined period elapses (the period of the fourth beat elapses), the simultaneous operation is required to be performed. Hereinafter, the period in which the simultaneous operation is required to be performed is referred to as a "simultaneous operation period (corresponding to an example of "a first specific period" of the present invention); the period in which the single operation is required is referred to as a "single operation period (corresponding to an example of "a second specific period" of the present invention); and the period in which "no operation" is required is referred to as a "no operation period (corresponding to an example of "a third specific period" of the present invention)."

On the basis of the above, with reference to FIG. 9, an example of a determination method for determining whether the simultaneous operation has been correctly performed, will be described. In FIG. 9, an arrow below the required operation data D1, indicates an elapsed time from the reproduction start of the musical piece. A timing T1 indicates an input detection timing of one of the A button 72d and the B button 72i. The game apparatus 3 judges whether a simultaneous operation period t2 is within a period t1 whose center is the timing T1 based on the required operation data D1. It is noted that although the period t1 is set so as to be longer than the simultaneous operation period t2 in the present embodiment, the period t1 may be the same as or shorter than the simultaneous operation period t2 as long as an operation to be judged correct can be properly determined. Specifically, the period t1 may be set so that the period t1 does not include both of the simultaneous operation period t2 and a single operation period t2a (see FIG. 10). The period t1 whose center is the timing T1 is a period before and after the timing T1. Because the period t1 is a period for determining coming of the simultaneous operation period t2 (or the single operation period t2a), it is not necessarily required to provide such a period before the timing T1 and may provide only after the timing T1. When a result of the judgment is affirmative, this point of time is a timing at which the simultaneous operation is judged to be correct. In FIG. 9, the simultaneous operation period t2 (corresponding to the period of the number 4) is within the period t1, it is determined that this point of time is the timing at which the simultaneous operation is judged to be correct.

When it is determined that this point of time is the timing at which the simultaneous operation is judged to be correct, the game apparatus 3 determines whether the simultaneous operation has been performed within the simultaneous operation period t2 (corresponding to the period of the number 4) based on one of an input detection timing of the A button 72d and an input detection timing of the B button 72i, whichever is detected later. In other words, when the input detection timing which is detected later is within the simultaneous operation period t2, it is determined that the simultaneous operation has been performed within the simultaneous operation period t2 even if the input detection timing which is detected earlier is not performed within the simultaneous operation period t2. In addition, the game apparatus 3 determines whether the input which is detected later is detected before a predetermined time period t3 (a time corresponding to several frames which can be allowed as substantially simultaneous, which is, hereinafter, referred to as a "simultaneous operation determination time t3") elapses from the timing T1. When results of the determinations are affirmative, it is determined that: the A button 72d and the B button 72i have been pressed substantially simultaneously within the simultaneous operation period t2 and the simultaneous operation has been performed at a at a correct timing, and thus it is determined that the proper operation has been performed. Specifically, in an example of FIG. 9, only when an input is detected later in a period t4 which is a period coinciding with the simultaneous operation period t2 and with the simultaneous operation determination time t3, it is determined that the simultaneous operation has been properly performed.

As described above, in the present embodiment, even when a timing of an input to the A button 72d does not coincides with a timing of an input to the B button 72i in the simultaneous operation determination time t3, it is allowed to be determined that the operations have been substantially simultaneously performed. Then, if only an input which is detected later is within the simultaneous operation period t2, it is determined that the simultaneous operation has been performed within the simultaneous operation period t2. Accordingly, a user who is not skilled in the operation can comfortably perform the simultaneous operation. Meanwhile, when: an input which is detected later is not detected before the simultaneous operation determination time t3 elapses after an input (timing T1) which is detected earlier; and the input which is detected later is not detected within the simultaneous operation period t2 (corresponding to the period of the number 4), it is not determined that the simultaneous operation has been performed at the correct timing, and thus it is judged that the inputs have not been properly performed.

Next, with reference to FIG. 10, an example of a method for determining whether the single operation has been correctly performed. In FIG. 10, a timing T2 indicates an input detection timing of the A button 72d. The game apparatus 3 judges whether the single operation period t2a is within the period t1 whose center is the timing T2 based on the required operation data D1. When a result of the judgment is affirmative, it is determined that this point of time is a timing at which the single operation is judged to be correct. In FIG. 10, because both of an upper arrow and a lower arrow indicate that the single operation period t2a (corresponding to the period of the number 9) is within the period t1, it is determined that this point of time is the timing at which the single operation is judged to be correct. However, even if it is the timing at which the single operation is judged to be correct, it is not determined that the single operation has been performed at the correct timing unless the input detection timing (timing T2) of the A button 72d is within the single operation period t2a, and thus it is judged that an improper input has been performed. Specifically, in an example indicated by the upper arrow, because the timing T2 is not in the single operation period t2a, it is judged that an improper input has been performed. Meanwhile, in an example indicated by the lower arrow, because the timing T2 is in the single operation period t2a (corresponding to the period of the number 9), it is determined provisionally that a proper input has been performed. Here, it is determined provisionally because the determination that the proper input has been performed is not conclusive, and may be reversed later.

In the present embodiment, as described above, it is determined whether the single operation period t2a is in the period t1, however, the determination is not necessarily performed. That is, it may be determined provisionally that a proper operation has been performed only by judging whether the input of the timing T2 has been performed within the single operation period t2a (corresponding to the period of the number 9).

The above described provisional determination that the proper operation has been performed becomes conclusive after a determination of whether an input detection timing of the B button 72i which is detected later is detected before the predetermined time period t3 elapses from the timing T2. Specifically, when an input of the B button 72i is detected before the simultaneous operation determination time t3 elapses, the provisional determination that the proper operation has been performed is cancelled and it is determined that an improper operation has been performed. This is because it is presumed that the user has mistakenly performed the simultaneous operation. In contrast, when no input of the B button 72i is detected before the simultaneous operation determination time t3 elapses after the timing T2, the provisional determination that the proper operation has been performed becomes conclusive.

As described above, in the single operation period t2a, in order to proceed the processing, it is provisionally determined that the proper input has been performed upon detection of an input of the A button 72d, thereby reducing a time lag between the input detection timing of the A button 72d and the input detection timing of the B button 72i.

Next, with reference to FIG. 11, a method for determining that: the operation buttons 72 are mistakenly pressed when this point of time is the timing at which "no operation" is judged to be correct; and an improper operation has been performed, will be described. The no operation period is a timing in which the period t1 whose center is the timing T1 (an input detection timing of one of the A button 72d and the B button 72i) includes neither the simultaneous operation period t2 nor the single operation period t2a. At the timing, it is a general rule to be determined that an improper input has been performed upon a detection of an input of either the A button 72d or the B button 72i.

Figure 12:
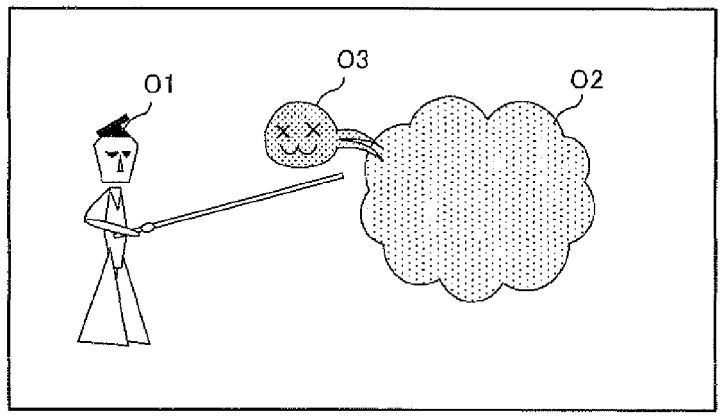
FIG. 12 is a diagram illustrating a screen on which a first stage representation is displayed.

Next, with reference to FIG. 12, a representation (hereinafter referred to as a "first stage representation," corresponding to an example of a "first representation" of the present invention), which is displayed when a provisional determination that a proper operation has been performed within the simultaneous operation period t2 is made as described above, will be described. FIG. 12 is a diagram illustrating a screen on which the first stage representation is displayed. In FIG. 12, the reference object O1 performs an attack action which is a representation of the sword being swung down. As described above, the provisional determination that the proper operation has been performed may be cancelled later by a detection (a detection before the simultaneous operation determination time t3 elapses) of the B button 72i being pressed. However, the provisional determination that the proper operation has been performed becomes conclusive if there is no detection (a detection before the simultaneous operation determination time t3 elapses) of the B button 72i being pressed. Accordingly, when the provisional determination that the proper operation has been performed is made, it is uncertain whether the determination becomes conclusive or may be cancelled. Thus, although the attack action for the first stage representation is not limited to an action of swinging down the sword, it is preferably an action that will not bring a sense of discomfort when the provisional determination that the proper operation has been performed later becomes conclusive or when the result of the determination changes to a determination that an improper operation has been performed.

Figure 13:
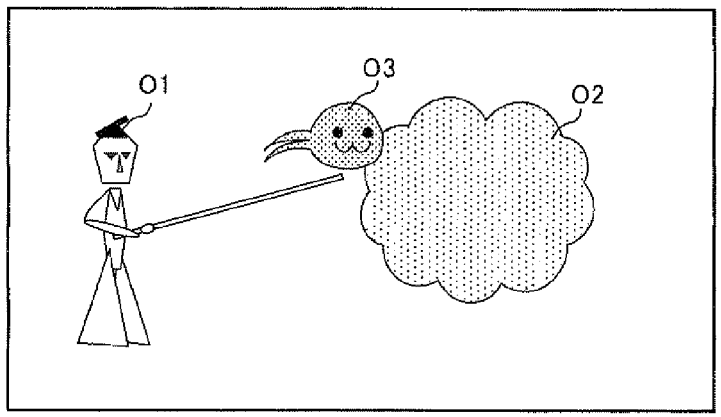
FIG. 13 is a diagram illustrating a screen on which s second stage representation of failed operation is displayed.

Next, with reference to FIG. 13, a representation (hereinafter referred to as a "second stage representation of failed operation," corresponding to an example of a "second representation" of the present invention) which is displayed, being switched from the first stage representation, when the provisional determination that the proper operation has been performed is cancelled later, will be described. FIG. 13 is a diagram illustrating a screen on which the second stage representation of failed operation is displayed. The second stage representation of failed operation is a representation whose content is subsequent to that of the first stage representation and the representation indicating that the user has performed the improper operation. As a representation of failed operation, an action in which, for example, as shown in FIG. 13, despite the first stage representation in which the reference object O1 has swung down the sword is displayed, the reference object O1 fails to defeat the instruction object O3, and the instruction object O3 flees into the black-cloud object O2.

The above described animation of the second stage representation of failed operation is an mere example, and may be any animation as long as the animation whose content is subsequent to that of the first stage representation and indicates that the user has performed an improper operation.

Figure 14:
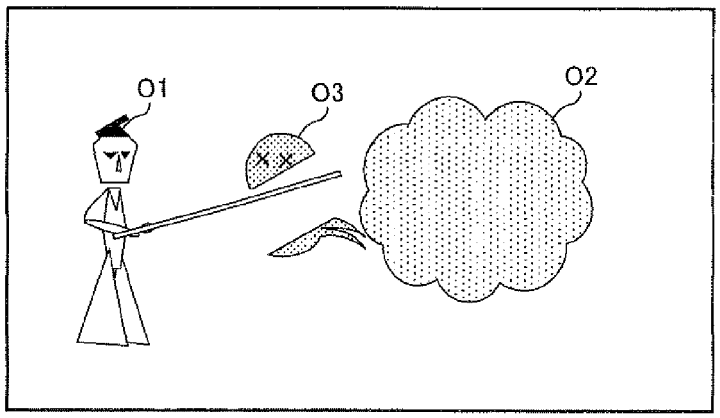
FIG. 14 is a diagram illustrating a screen on which a second stage representation of successful operation is displayed.

Next, with reference to FIG. 14, a representation (hereinafter referred to as a "second stage representation of successful operation", corresponding to an example of a "third representation" of the present invention) which is displayed, being switched from the first stage representation, when the provisional determination that the proper operation has been performed becomes conclusive will be described. FIG. 14 is a diagram illustrating a screen on which the second stage representation of successful operation is displayed. The second stage representation of successful operation is a representation whose content is subsequent to that of the first stage representation and the representation indicating that the user has performed the proper operation. For example, as shown in FIG. 14, in the second stage representation of successful operation, a scene in which the reference object O1, having swung down the sword in the first stage representation, strikes and terminates the instruction object O3 is displayed. The above described second stage representation of successful operation is also a mere example, and may be any representation as long as the content is subsequent to that of the first stage representation and indicates that the user has performed the proper operation. It is noted that each of the second stage representation of failed operation, the second stage representation of successful operation, and the first stage representation may not be necessarily an animation, but may be a still image, an output of audio, or the like.

Figure 15:
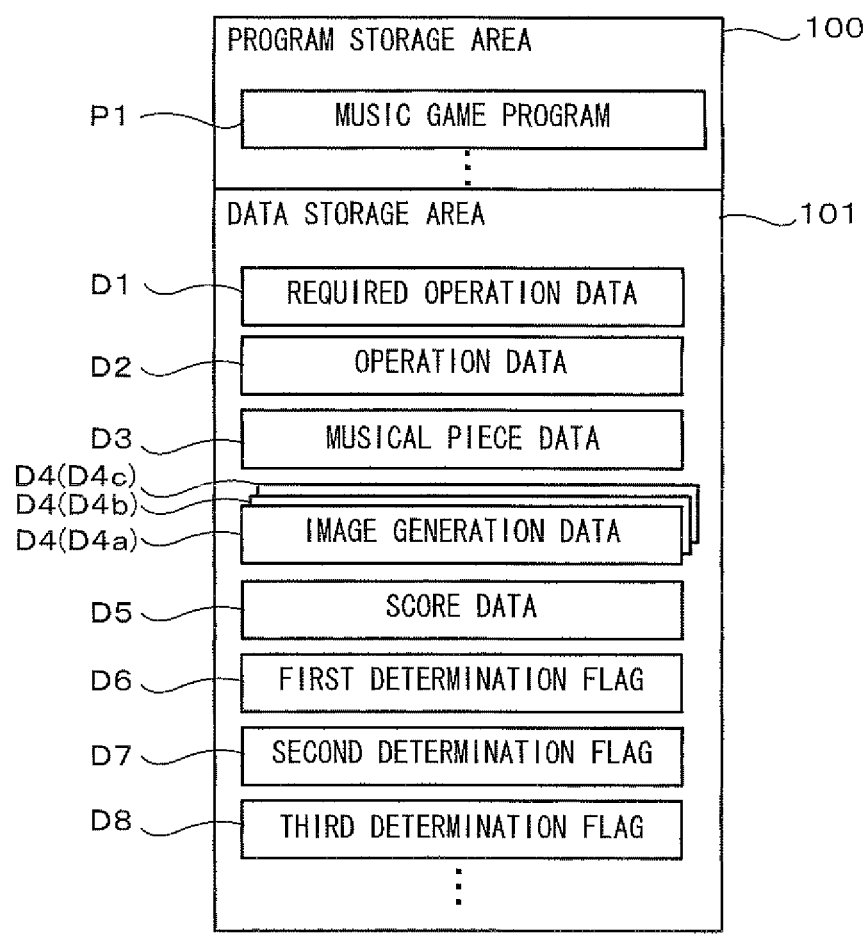
FIG. 15 is shows an example of programs and various data stored in an internal main memory and/or an external main memory.

Next, with reference to FIG. 15, various program and various data stored in the internal main memory 11e and/or the external main memory 12 will be described. FIG. 15 is a diagram illustrating programs and various data stored in the internal main memory 11e and/or the external main memory 12. The various data are stored in accordance with the programs being executed by the game apparatus 3. The program and the various data shown in FIG. 15 may be stored in either the internal main memory 11e or the external main memory 12.

The internal main memory 11e and/or the external main memory 12 include a program storage area 100 and a data storage area 101. The program storage area 100 stores therein a music game program P1. The music game program P1 is a program for causing the CPU 10 to perform the music game processing.

The data storage area 101 stores therein the required operation data D1, operation data D2, musical piece data D3, image generation data D4 (D4a to D4c), score data D5, a first determination flag D6, a second determination flag D7, a third determination flag D8, and the like. The required operation data D1 is, as described with reference to FIGS. 9 to 11, data indicating an operation which the user is required to perform at each of the regular intervals (for example, for every period of one beat) from the reproduction start of the musical piece. Based on the required operation data D1, the instruction object O3 (the simultaneous operation instruction object O3a, the single operation instruction object O3b) as shown in FIG. 8B is displayed. Based on the required operation data D1, it is determined what type of operation is judged to be correct at this point of time, and it is determined whether the user has properly performed the operation. It is noted that, in the present embodiment, the user can select one musical piece to be adopted in a music game from among a plurality of musical pieces. Accordingly, only the required operation data D1 which corresponds to the musical piece data D3 selected by the user is read from the optical disc 4 or the like and stored.

The operation data D2 is data transmitted from the controller 7 at every transmission interval, which is stored temporarily by the input/output processor 11a. The operation data D2 is discarded after being processed by the CPU 10, however, the transmission interval (5 ms, for example) of controller 7 is shorter than the processing interval (1/60 sec., for example) of the CPU 10, which may result in where a plurality of pieces of the operation data D2 are stored. By referring to the operation data D2, the CPU 10 determines what type of operation (an operation of pressing the A button 72d, an operation of pressing the B button 72i, no operation, and the like) the user performs during, for example, the immediately previous 1/60 sec.

The musical piece data D3 is, for example, audio data of one musical piece which is divided into each frame (sector) of a predetermined duration. As described above, in the present embodiment, the user can select one piece of musical piece to be adopted in the music game from among the plurality of musical pieces. Accordingly, from among a plurality of pieces of the musical piece data D3, only the musical piece data D3 selected by the user is read from the optical disc 4 or the like and stored. Based on the musical piece data D3, the DSP 11c reproduces the audio data. The musical piece data D3 may be MIDI data or the like and the DSP 11c may generate audio data based on the musical piece data D3. The image generation data D4 (D4a to D4c) is data for generating the game images as described with reference to FIGS. 8A, 8B, and 12 to 14. The image generation data D4a is: data for generating the reference object O1; position information; orientation information; information indicating a content of an action performed by the object; or the like. The image generation data D4b is data for generating the black-cloud object O2, and is data indicating, for example, position information, orientation information, and the like of the black-cloud object O2. Further, the image generation data D4c is data for generating the instruction object O3, and is, for example, a type (the simultaneous operation instruction object O3a or the single operation instruction object O3b) to be displayed, position information, orientation information, information indicating a content of an action performed by the object, and the like of the instruction object O3. The score data D5 is data indicating a current score of the user, to which a predetermined value is added each time a determination that the correct operation (proper operation) has been performed becomes conclusive.

The first determination flag D6 is a flag for determining, during a timing (time period) at which the simultaneous operation is judged to be correct, whether the A button 72d has been pressed, after the B button 72i is pressed, at a timing (before the simultaneous operation determination time t3 elapses) that can be determined to be substantially simultaneous with the A button 72d being pressed. The second determination flag D7 is a flag for determining, during a timing at which the simultaneous operation is judged to be correct, whether the B button 72i has been pressed, after the A button 72d is pressed, at a timing that can be determined to be substantially simultaneous with the timing of the B button 72i being pressed. The third determination flag D8 is a flag for determining, during a timing at which the single operation is judged to be correct, whether the B button 72i is detected being pressed at a timing that can be determined to be substantially simultaneous with the timing of the A button 72d being pressed.

The above described music game program P1 and the data D1 to D8 may be, for example, read from the optical disc 4, the flash memory 17, and the like and stored in the program storage area 100 and the data storage area 101, respectively. Alternatively, the music game program P1 and the data D1 to D8 may be received from other communication apparatuses via the wireless communication module 18. It is noted that all of pieces of the required operation data D1 and the musical piece data D3 are stored in the optical disc 4, the flash memory 17, and the other communication apparatuses. From among all the pieces of the required operation data D1 and the musical piece data D3, only the musical piece data D3 selected by the user and the required operation data D1 corresponding thereto are stored in the data storage area 101.

Figure 16:
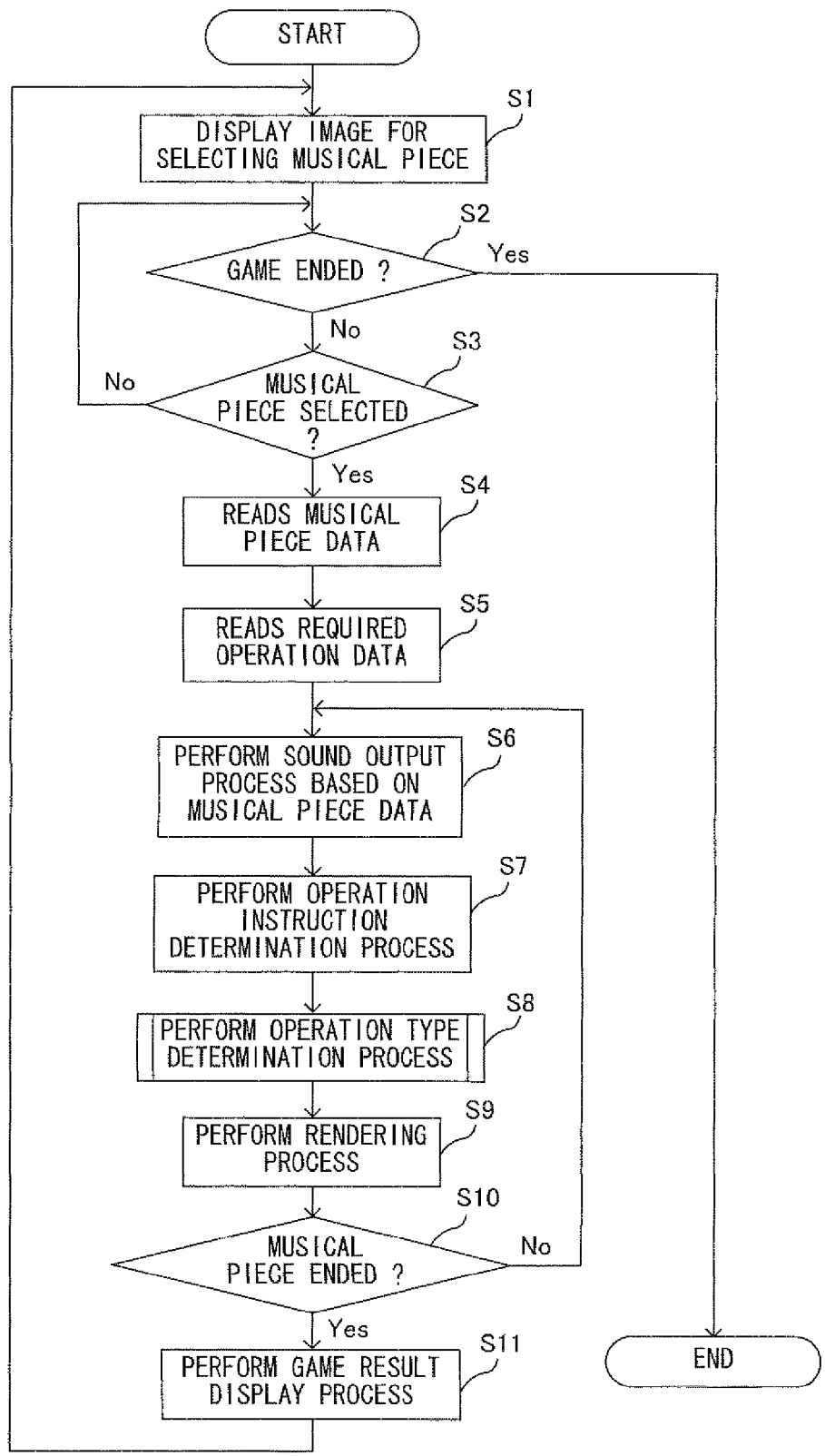
FIG. 16 is a flow chart illustrating an example of a main process in music game processing.

In the following, with reference to FIGS. 16 to 20, the music game processing will be described in detail. FIG. 16 is a flow chart illustrating an example of a main process in the music game processing. On receipt of an instruction for starting the music game program from the user, the CPU 10 starts to perform the music game processing. It is noted that flow charts of FIGS. 16 to 20 are mere examples. The order in which respective steps are performed may be changed as long as the same results are obtained.

First, the CPU 10 performs a display process for displaying, on the screen of the television 2, an image (a image for musical piece selection) for urging the user to select one musical piece from among the plurality of musical pieces (S1). In the image for musical piece selection, information for guiding the user to select an instruction to end the music game is also displayed. Then, the CPU 10 judges whether the instruction to end the music game has been received from the user (S2). When a result of the judgment is that the instruction to end the music game has been received from the user (YES in S2), the CPU 10 ends the main process. On the other hand, when the result of the judgment is that the instruction to end the music game has not been received from the user (NO in S2), the CPU 10 judges whether an instruction for selection of one musical piece has been received from the user (S3).

When a result of the judgment is that the instruction for selection of one musical piece has not been received from the user (NO in S3), the CPU 10 returns the processing to step S2. On the other hand, when the result of the judgment is that the instruction for selection of one musical piece has been received from the user (YES in S3), the CPU 10 reads the musical piece data D3 from the optical disc 4 and the like and store the musical piece data D3 in the data storage area 101 (S4). Subsequently, the CPU 10 reads the required operation data D1 corresponding to the musical piece data D3 from the optical disc 4, and the like and stores the required operation data D1 in the data storage area 101 (S5).

Subsequently, the CPU 10 performs, for example, processes of steps S6 to S10 per frame, thereby performing a process for providing the user with a music game in which the musical piece selected by the user is used. Specifically, the CPU 10 performs a process (a sound output process) for instructing the DSP 11e to reproduce the musical piece based on the musical piece data D3 read in step S4 (S6). Here, the DSP 11c is instructed to perform a process for outputting audio in accordance with sector data to be reproduced from among the musical piece data D3.

Then, the CPU 10 performs the operation instruction determination process for displaying the game images as shown in FIGS. 8A and 8B (S7). The operation instruction determination process is a process for determining, based on the required operation data D1 and a reproduction position of the musical piece data D3, the type of the instruction object O3 (the simultaneous operation instruction object O3a or the single operation instruction object O3b) to be displayed at the operation timing of the user. The process will be described in detail. In the present embodiment, when the operation instruction determination process is performed for the first time, the CPU 10 generates the image generation data D4a and D5a for displaying the reference object O1 and the black-cloud object O2 and stores the generated image generation data D4a and D5a in the data storage area 101. Because the operation which the user is required to perform is switched at regular intervals (for example, for every period of one beat) from the reproduction start of the musical piece, the CPU 10 performs a process, immediately before the predetermined period elapses, for displaying the type of the instruction object O3 in accordance with the operation type of the following predetermined period. When "no operation" is required in the next predetermined period, the instruction object O3 is not displayed. With reference to an example of FIG. 9, immediately before the period of the third beat in which "no operation" is required elapses, a process is performed for displaying the type of the instruction object O3 (that is, the simultaneous operation instruction object O3a) in accordance with the "simultaneous operation" which is required in the period of the fourth beat. When the CPU 10 determines to display the instruction object O3, the CPU 10 generates the image generation data D4c and stores the image generation data D4c in the data storage area 101. Then, the CPU 10 sequentially updates a position, an orientation, and the like of the image generation data D4c so that a display position of the instruction object O3 is changed over the predetermined period. When a predetermined period elapses after the instruction object O3 is displayed, the CPU 10 deletes the image generation data D4c, and then terminates the display of the instruction object O3.

Next, the CPU 10 performs the operation type determination process (S8). In the operation type determination process, the CPU 10 determines whether the user has performed a proper operation, and based on a result of the determination, the CPU 10 determines a content of a representation. The operation type determination process will be described in detail later with reference to FIGS. 17 to 20. It is noted that, in the operation type determination process, the CPU 10 also performs a process for incrementing the user's score based on the result of the determination.

Next, the CPU 10 perform a rendering process by means of the GPU 11b (S9). In the rendering process, in accordance with the results of the determinations in steps S7 and S8 (based on the image generation data D4), the CPU 10 instructs the DSP 11c to render a game image in the VRAM 11d. Then, the CPU 10 judges whether audio of all the sector data contained in the musical piece data D3 have been outputted (S10). When a result of the judgment is that not all of the audio of all the sector data contained in the musical piece data D3 have been outputted (NO in S10), the CPU 10 returns the processing to step S6. Accordingly, the processes of steps S6 to S10 are repeatedly performed until a result of judgment that the audio of all the sector data contained in the musical piece data D3 have been outputted is obtained. When the result of the determination is that the audio of all the sector data contained in the musical piece data D3 have been outputted (YES in S10), the CPU 10 displays a result of the game based on the user's score (score data D5) (S11). Then, the CPU 10 returns the processing to step S1.

Figure 17:
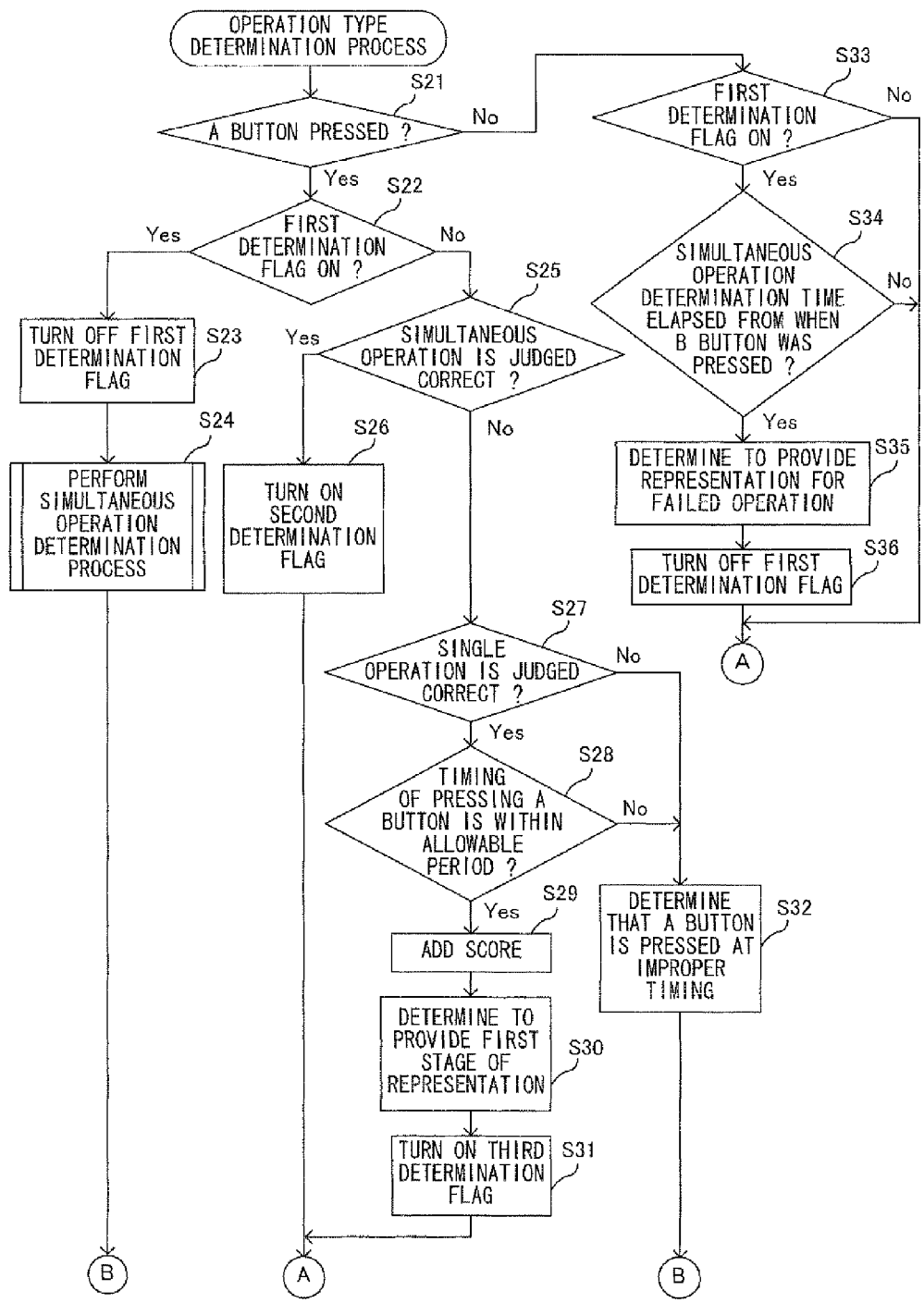
FIG. 17 is a flow chart illustrating an example of an operation type determination process (first part)
Figure 18:
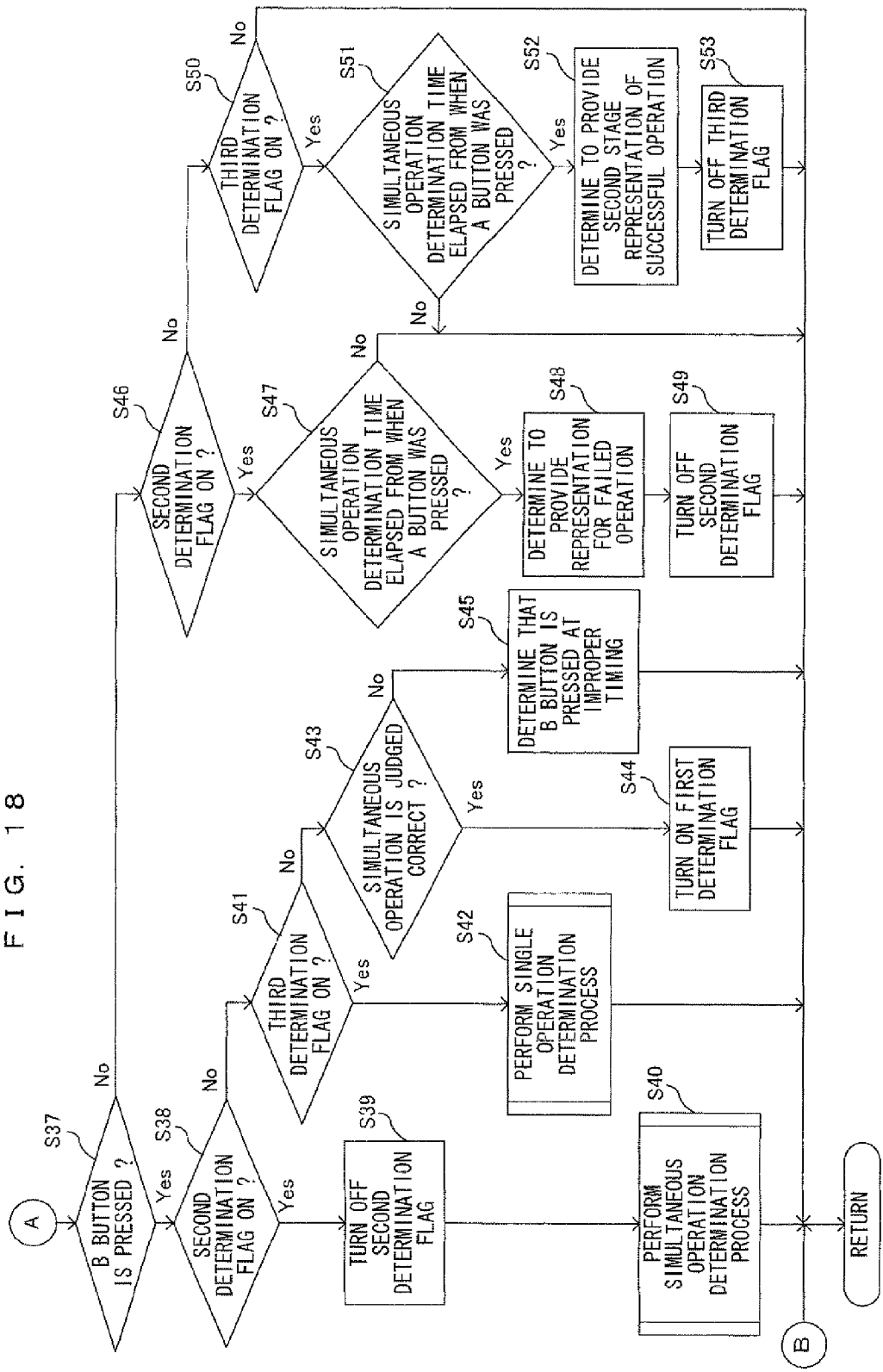
FIG. 18 is a flow chart illustrating an example of the operation type determination process (second part)
Figure 19:
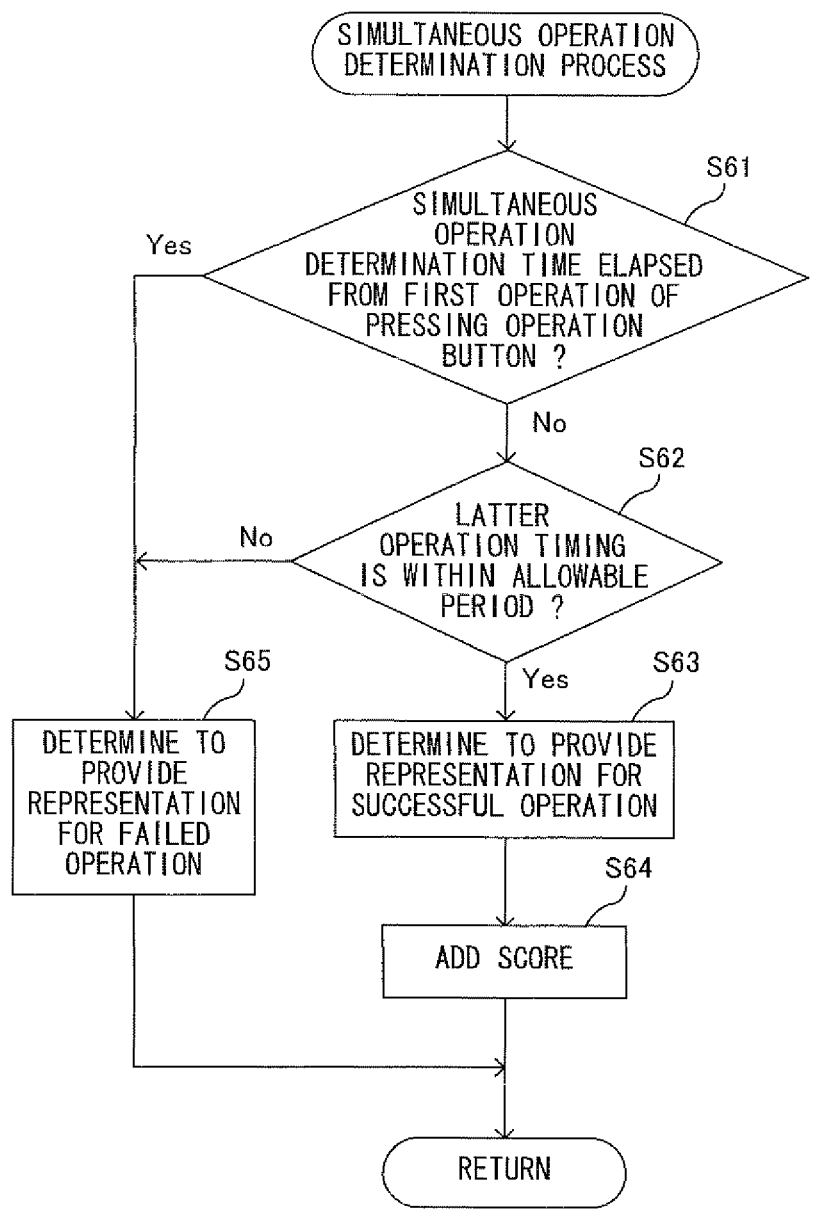
FIG. 19 is a flow chart illustrating an example of a simultaneous operation determination process performed at steps S24 and S40.
Figure 20:
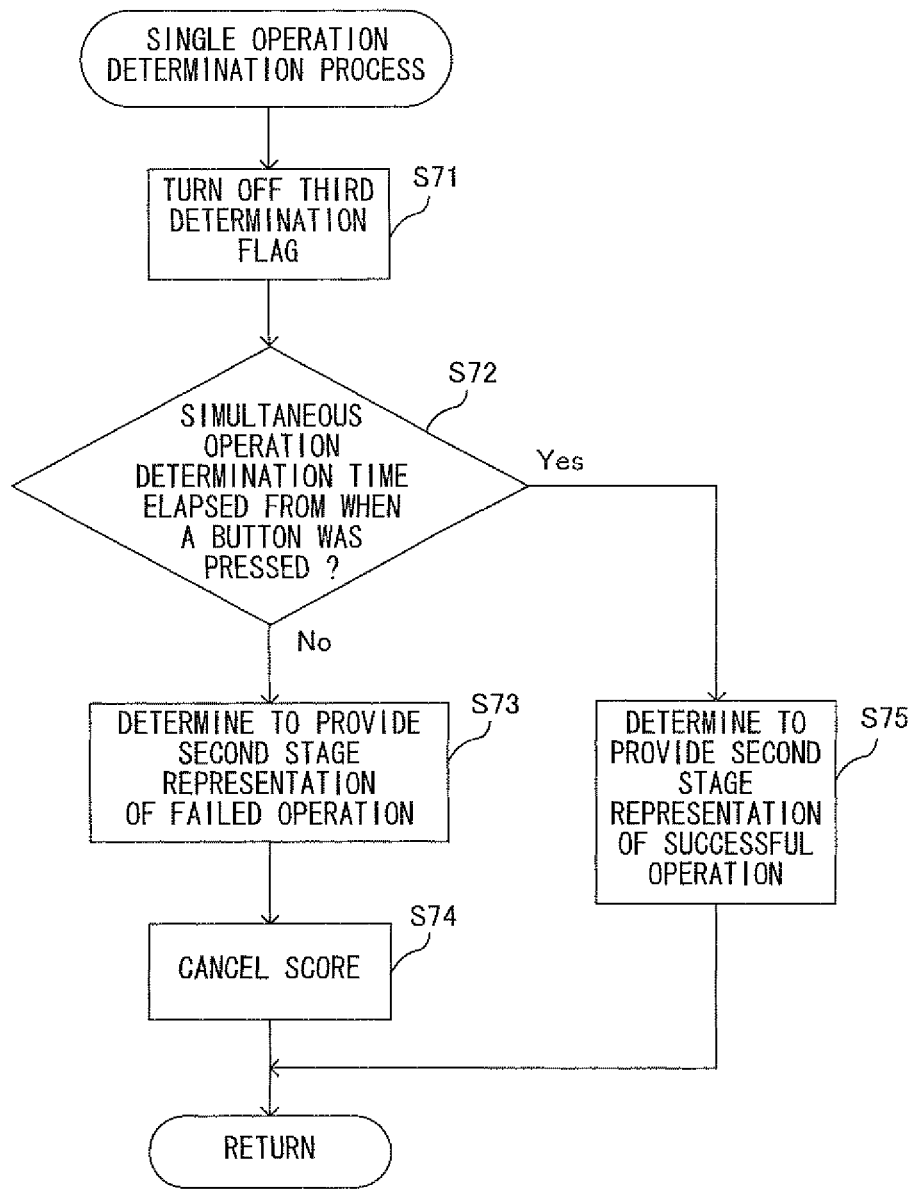
FIG. 20 is a flow chart illustrating an example of a single operation determination process performed at step S42.

Next, with reference to FIGS. 17 to 20, an example of the above described operation type determination process in step S8 will be described. FIG. 17 is a flow chart illustrating an example of the operation type determination process (first part). FIG. 18 is a flow chart illustrating an example of the operation type determination process (second part). FIG. 19 is a flow chart illustrating an example of the simultaneous operation determination process performed in steps S24 and S40. FIG. 20 is a flow chart illustrating an example of a single operation determination process performed in step S42.

With reference to FIG. 17, when the process is performed for the first time, first the first determination flag D6, the second determination flag D7, and the third determination flag D8 are turned off. Then, the CPU 10 judges whether the A button 72d has been pressed based on the operation data D2 (S21). When a result of the judgment is that the A button 72d has been pressed (YES in S21), the CPU 10 judges whether the first determination flag D6 is turned ON (S22). It is noted that when the first determination flag D6 is turned ON, the B button 72i is already pressed (when the B button 72i is pressed, and it has not been determined in the later described step S34 that the simultaneous operation determination time t3 has elapsed after the time B button 72i is pressed). When a result of the judgment is that the first determination flag D6 is turned ON (YES in S22), the CPU 10 turns OFF the first determination flag D6, ends time measuring started from the time the first determination flag D6 is turned ON (S23), and performs the simultaneous operation determination process (S24). The simultaneous operation determination process is a process in which the CPU 10 determines that the A button 72d has been pressed at a proper timing (substantially simultaneous with the B button 72i being pressed and in the simultaneous operation period t2), and determines the content of the representation in accordance with a result of the determination. The simultaneous operation determination process will be described in detail later with reference to FIG. 19. Then, the CPU 10 ends the operation type determination process and returns the processing to the main process.

Next, when the result of the judgment is that the first determination flag D6 is not turned ON (NO in S22), the CPU 10 judges whether this point of time is a timing at which the simultaneous operation is judged to be correct (S25). As a method for judging whether this point of time is the timing at which the simultaneous operation is judged to be correct, for example, the method described with reference to FIG. 9 can be used. Specifically, for example, the CPU 10 obtains, as the timing T1 (see FIG. 9), a current reproduction position (the number of samples to be reproduced, and the like, which is hereinafter referred to as "the number of reproduction samples") of the musical piece data D3. Then, based on the required operation data D1, the CPU 10 judges whether the simultaneous operation period t2 is present in the period t1 whose center is the timing T1. Specifically, the required operation data D1 contains, for example, information such as reproduction sample numbers (reproduction sample numbers corresponding to the first beat are 0 to n, for example,) corresponding to each of the regular intervals. The CPU 10 judges, based on the reproduction sample numbers corresponding to each of the regular intervals, whether the reproduction sample numbers of the simultaneous operation period t2 are present in predetermined sample numbers (the numbers corresponding to the period t1) before and after the timing T1. When a result of the judgment is affirmative, the CPU 10 judges that this point of time is a timing at which the simultaneous operation is judged to be correct. It is noted that the method is a mere example, and another method may be used for judging whether this point of time is the timing at which the simultaneous operation is judged to be correct.

The method similar to the above described determination method is also used for judging "whether this point of time is the timing at which the simultaneous operation is judged to be correct" or "whether this point of time is a timing at which the single operation is judged to be correct" in the later described steps S27, S43, and the like. The determination for whether this point of time is the timing at which the single operation is judged to be correct is a determination for, when the current reproduction position is the timing T2 (see FIG. 10), whether the reproduction sample numbers of the single operation period t2a are present within a predetermined sample numbers (the numbers corresponding to the period t1) before and after the timing T2.

When a result of the judgment is that this point of time is the timing at which the simultaneous operation is judged to be correct (YES in S25), the CPU 10 turns ON the second determination flag D7 (S26). At this time, the CPU 10 starts time measuring (for, example, starts to count the number of frames). Then, the CPU 10 proceeds the processing to the later described step S37. On the other hand, when the result of the judgment is that this point of time is not the timing at which the simultaneous operation is judged to be correct (NO in S25), the CPU 10 judges whether this point of time is the timing at which the single operation is judged to be correct (S27). As a method for judging whether this point of time is the timing at which the single operation is judged to be correct, for example, the method described with reference to FIG. 10 may be used. When a result of the judgment is that this point of time is the timing at which the single operation is judged to be correct (YES in S27), the CPU 10 judges whether a timing (that is, this point of time) of detecting the A button 72d being pressed is within an allowable period (S28). Here, the allowable period is the single operation period t2a as described with reference to FIG. 10. For example, whether this point of time is within the allowable period is judged by using the following method. The CPU 10 divides the number of samples having been reproduced by the total number of samples of the musical piece data D3, and multiplies the obtained value by the total number of beats of the musical piece data D3, thereby obtaining the beat number currently reproduced. The CPU 10 refers to the required operation data D1 for the obtained value, and obtains a type of operation corresponding to the currently reproduce beat. When the type of operation is the single operation, the CPU 10 determines that this point of time is within the allowable period.

It is noted that the above method is mere example, and another method may be adopted for judging whether this point of time is within the allowable period. As described above, for example, because the reproduction sample numbers corresponding to each of the regular intervals in the required operation data D1 are stored in the data storage area 101, whether this point of time is within the allowable period may be judged depending on whether the currently reproduced sample number in the musical piece data D3 is included in the sample numbers corresponding to the single operation period t2a (the ninth beat in FIG. 10). The determination for "whether a detection timing of a latter operation of pressing the operation button 72 is within the allowable period" in the later described step S62 is performed in a manner similar to step S28.

When a result of the judgment is that the detection timing (that is, this point of time) of the A button 72d being pressed is within the allowable period (YES in S28), the CPU 10 adds a predetermined value to the score data D5 (S29). Then, the CPU 10 determines the first stage representation as described with reference to FIG. 12 as a content of representation to be provided (S30). Specifically, the CPU 10 updates the image generation data D4a and D4c for demonstrating an action corresponding to the first stage representation. When the first stage representation is determined to be the content of representation to be provided, a process is performed in the subsequent rendering process of step S9 so that the reference object O1 and the instruction object O3 respectively perform the actions during the course of several frames.

As described above, the first stage representation starts at the detection timing of the A button 72d being pressed, thereby reducing a time lag between the user's operation and the representation start. Then, the CPU 10 turns ON the third determination flag (S31). At this time, the CPU 10 starts time measuring (for example, starts to count the number of frames). Then, the CPU 10 proceeds the processing to the later described step S37.

When the result of the judgment is that this point of time is not the timing at which the single operation is judged to be correct (NO in S27), and when the result of the judgment is that a timing (that is, this point of time) of detection of the A button 72d being pressed is not within the allowable period (NO in S28), the CPU 10 determines that the A button 72d has been pressed at an improper timing (S32). In this case, for example, a sound effect indicating that an improper operation has been performed may be outputted. Then, the CPU 10 ends the operation type determination process and returns the processing to the main process.

Next, a process performed when the result of the judgment is that the A button 72d is not pressed in step S21 will be described. In this case (NO in S21), the CPU 10 judges whether the first determination flag D6 is turned ON (S33). When a result of the judgment is that the first determination flag D6 is turned ON (YES in S33), the CPU 10 judges, based on a measured time from the time the first determination flag D6 is turned ON, whether the simultaneous operation determination time t3 has elapsed from the time the B button 72i is pressed (S34). When a result of the judgment is that the simultaneous operation determination time t3 has elapsed from the time the B button 72i is pressed (YES in S34), the CPU 10 determines to provide a representation (a representation of failed operation) indicating that the user has performed an improper operation (S35). Specifically, the CPU 10 updates the image generation data D4a and D4c for demonstrating an action corresponding to the representation of failed operation. When the representation of failed operation is determined as the content of representation to be provided, the process is performed in the subsequent rendering process of step S9 so that the reference object O1 and the instruction object O3 respectively perform the actions during the course of several frames. Here, the representation of failed operation is such as an output of audio and/or an animation indicating that an improper operation has been performed. In the present embodiment, an animation is displayed, in which the reference object O1 performs an action of swinging down the sword, and despite the action, the instruction object O3 flees without being defeated.

As described above, in step S35, when the A button 72d is not pressed before the simultaneous operation determination time t3 elapses after the B button 72i is pressed (when the first determination flag D6 is turned ON), the CPU 10 determines that the user has performed an improper operation (the user has mistakenly performed the single operation despite the simultaneous operation is required), and determines the representation of failed operation as the content of representation to be provided. Here, the representation of failed operation of the simultaneous operation is performed when the simultaneous operation determination time t3 elapses, which results in a small time lag between the user's first operation (of pressing the B button 72i) and the representation start.

Next, the CPU 10 turns OFF the first determination flag D6 and ends the time measuring started when the first determination flag D6 is turned ON (S36). Then, the CPU 10 proceeds the processing to the later described step S37.

On the other hand, when the result of the judgment is that the first determination flag D6 is not turned ON (NO in S33), and when the result of the judgment is that the simultaneous operation determination time 13 has not elapsed (NO in S34) from the time the B button 72i is pressed, the CPU 10 proceeds the processing to the later described step S37 without performing steps S35 and S36.

With reference to FIG. 18, the CPU 10 judges whether the B button 72i has been pressed based on the operation data D2 (S37). When a result of the judgment is that the B button 72i has been pressed (YES in S37), the CPU 10 judges whether the second determination flag D7 is turned ON (S38). When the result of the judgment is that the second determination flag D7 is turned ON, the A button 72d is already pressed (the A button 72d is pressed and it has not been determined that the simultaneous operation determination time t3 has elapsed in the later described step S47). Here, when a result of the judgment is that the second determination flag D7 is turned ON (YES in S38), the CPU 10 turns OFF the second determination flag D7 and ends the time measuring started when the second determination flag D7 is turned ON (S39). Then, the CPU 10 performs the simultaneous operation determination process (S40). The simultaneous operation determination process is a process in which: the CPU 10 determines whether the B button 72i has been pressed at a proper timing (pressed substantially simultaneously with the A button 72d being pressed and within the simultaneous operation period t2); and the CPU 10 determines the content of representation in accordance with the determination result. The simultaneous operation determination process will be described in detail later with reference to FIG. 19. Then, the CPU 10 ends the operation type determination process and returns the processing to the main process.

On the other hand, when the result of the judgment is that the second determination flag is not turned ON (NO in S38), the CPU 10 judges whether the third determination flag D8 is turned ON (S41). When a result of the judgment is that the third determination flag is turned ON (YES in S41), the CPU 10 performs the single operation determination process (S42). The single operation determination process is a process in which the CPU 10 determines whether an operation of pressing the A button 72d is the single operation (whether the B button 72i is not pressed immediately after the operation of pressing the A button 72d) or the simultaneous operation (whether the B button 72i is pressed immediately after the operation of pressing the A button 72d); and determines a content of representation in accordance with a result of the determination. The single operation determination process will be described later with reference to FIG. 20. Then, the CPU 10 ends the operation type determination process and returns the processing to the main process.

Next, a process to be performed when the result of the judgment by the CPU 10 is NO in step S41 will be described. When a result of the judgment is that the second determination flag is not turned ON (NO in S41), the CPU 10 judges whether this point of time is the timing at which the simultaneous operation is judged to be correct (S43). When a result of the judgment is that this point of time is the timing at which the simultaneous operation is judged to be correct (YES in S43), the CPU 10 determines that an operation of pressing the B button 72i is the first operation of the simultaneous operation and thus turns ON the first determination flag D6 (S44). At this time, the CPU 10 starts time measuring. Then, the CPU 10 ends the operation type determination process and returns the processing to the main process.

When the result of the judgment is that this point of time is not the timing at which the simultaneous operation is judged to be correct (NO in S43), the CPU 10 determines that the B button 72i has been pressed at an improper timing (S45). In this case, for example, a sound effect indicating that an improper operation has been performed may be outputted. Then, the CPU 10 ends the operation type determination process and returns the processing to the main process.

In the following, a process to be perforated when the result of the judgment by the CPU 10 is NO in step S37 will be described. When the result of the judgment is that the B button 72i is not pressed (NO in S37), the CPU 10 judges whether the second determination flag D7 is turned ON (S46). When a result of the judgment is that the second determination flag D7 is turned ON, that is, when the A button is already pressed at the timing at which the simultaneous operation is judged to be correct (YES in S46), the CPU 10 judges whether the simultaneous operation determination time t3 has elapsed from the time the A button 72d is pressed based on the measured time from the time the second determination flag D7 is turned ON (S47). When a result of the judgment is that the simultaneous operation determination time t3 has elapsed from the time the A button 72d is pressed (YES in S47), the CPU 10 determines to provide a representation (a representation of failed operation) indicating that the user has performed an improper operation (S48).

The above described representation of failed operation is a representation similar to that in the above described step S35. Accordingly, when the B button 72i is not pressed before the simultaneous operation determination time t3 elapses after the A button 72d is pressed, the CPU 10 determines that the user has performed an improper operation (the user has mistakenly performed the single operation despite the simultaneous operation is required); and determines to perform the representation of failed operation in step S48. Here, the representation of failed operation of the simultaneous operation is performed when the simultaneous operation determination time t3 elapses, which results in a small time lag between the user's first operation (of pressing the A button 72d) and the representation start. Next, the CPU 10 turns OFF the second determination flag D7, and ends the time measuring started when the second determination flag D7 is turned ON (S49). Then, the CPU 10 ends the operation type determination process and returns the processing to the main process.

On the other hand, when the result of the judgment is that the simultaneous operation determination time t3 has not elapsed from the time the A button 72d is pressed (NO in S47), the CPU 10 ends the operation type determination process without performing steps S48 and S49, and returns the processing to the main process.

Next, a process to be performed when the result of the judgment by the CPU 10 is NO in step S46 will be described. When the result of the judgment is that the second determination flag D7 is not turned ON (NO in S46), the CPU 10 judges whether the third determination flag D8 is turned ON (S50). When a result of the judgment is that the third determination flag D8 is turned ON (YES in S50), the CPU 10 judges whether the simultaneous operation determination time t3 has elapsed from the time when the A button 72*d* is pressed based on the measured time from the time when the third determination flag D8 is turned ON (S51). Here, when a result of the judgment is that the simultaneous operation determination time t3 has elapsed from the time when the A button 72*d* is pressed (YES in S51), the CPU 10 determines that the simultaneous operation has not been performed and the single operation has been correctly performed, thereby determining the second stage representation of successful operation as described above with reference to FIG. 14 as a content of representation to be provided (S52). Specifically, the CPU 10 updates the image generation data D4*a* and D4*c* for demonstrating an action corresponding to the second stage representation of successful operation. When the second stage representation of successful operation is determined as the content of representation to be provided, the process is performed in the subsequent rendering process of step S9 so that the reference object O1 and the instruction object O3 respectively perform the actions during the course of several frames.

As described above, the first stage representation starts at the detection timing of the A button 72*d* being pressed. Then, when the determination that the single operation has been performed becomes conclusive, the first stage representation is switched to the second stage representation of successful operation indicating a successful operation. Consequently, a time lag between the time when the A button 72*d* is pressed and the representation start becomes smaller, and a representation corresponding to a success or a failure of an operation can be provided. The CPU 10 turns OFF the third determination flag D8, and ends the time measuring started when the third determination flag D8 is turned ON (S53). Then, the CPU 10 ends the operation type determination process and returns the processing to the main process.

On the other hand, when the result of the judgment is that the simultaneous operation determination time t3 has not elapsed from the time when the A button 72*d* is pressed (NO in S51), the CPU 10 ends the operation type determination process without performing steps S52 and S53, and returns the processing to the main process.

Next, a process to be performed when the result of the judgment is NO in step S50, that is, when the result of the judgment is that the third determination flag D8 is not turned ON will be described. In this case (NO in S50), the CPU 10 ends the operation type determination process without performing any process and returns the processing to the main process.

Next, with reference to FIG. 19, the simultaneous operation determination process will be described. The CPU 10 judges whether the simultaneous operation determination time 13 has elapsed from the detection timing of the first operation of pressing the operation button 72 based on the measured time from the time one of the first determination flag D6 and the second determination flag D7 is turned ON (S61). In the simultaneous operation determination process in step S24, the CPU 10 judges whether the simultaneous operation determination time t3 has elapsed from the time when the B button 72*i* is pressed, while in the simultaneous operation determination process in step S40, the CPU 10 judges whether the simultaneous operation determination time t3 has elapsed from the time when the A button 72*d* is pressed. When a result of the judgment is that the simultaneous operation determination time t3 has not elapsed from the detection timing of the operation button 72 being pressed (NO in S61), the CPU 10 judges whether the detection timing (that is, this point of time) of the latter operation of pressing the operation button 72 is within the allowable period (S62). Here, the allowable period is the simultaneous operation period t2 (the period of the fourth beat in the example of FIG. 9). In the simultaneous operation determination process in step S24, the latter operation of pressing the operation button 72 is an operation of pressing the A button 72*d*, while in the simultaneous operation determination process in step S40, the latter operation of pressing the operation button 72 is an operation of pressing the B button 72*i*.

When a result of the judgment is that the detection timing (that is, this point of time) of the latter operation of pressing the operation button 72 is within the allowable period (YES in S62), the CPU 10 determines the representation of successful operation as the content of representation to be provided (S63). Specifically, the CPU 10 updates the image generation data D4*a* and D4*c* for demonstrating an action corresponding to the representation of successful operation. For example, the CPU updates the image generation data D4*a* for demonstrating an action in which the reference object O1 swings the sword and updates the image generation data D4*c* for demonstrating an action in which the instruction object O3 is cut off by the sword. When the representation of successful operation is determined as the content of representation to be provided, the process is performed in the subsequent rendering process of step S9 so that the reference object O1 and the instruction object O3 respectively perform the actions during the course of several frames. It is noted that the representation of successful operation is not limited to a representation in which the reference object O1 and the instruction object O3 perform a specific action. The representation of successful operation may be any content as long as the content indicates that the user has performed a proper operation, and may be an output of audio, or the like.

As described above, in the present embodiment, when the detection timing of the first operation of pressing the operation button 72 is not within the allowable period, it is determined that a proper operation has been performed if the detection timing of the latter operation of pressing the operation button 72 is within the allowable period. Accordingly, when the simultaneous operation is required, even if not both of timings of the two types of operations are within the allowable period, only one of the timings is required to be within the allowable period. Accordingly, it is more likely to be determined that the simultaneous operation has been performed within the allowable period, thereby improving operability.

Further, the determination of whether the detection timing is within the allowable period is judged by using that of the latter operation of pressing the operation button 72, but not that of the first operation of pressing the operation button 72. If the determination of whether the detection timing is within the allowable period is judged by using that of the first operation of pressing the operation button 72, the detection timing of the first operation needs to be stored until the latter operation of pressing the operation button 72 is detected. Then, when the latter operation of pressing the operation button 72 is detected, whether the detection timing of the latter operation is within the allowable period is judged, which makes the process complicated. In the present embodiment, whether the detection timing is within the allowable period is judged by using that of the latter operation of pressing the operation button 72 without having storing the detection timing of the first operation of pressing the operation button 72. Then, when the latter operation of pressing the operation button 72 is detected, it is only necessary to judge whether this point of time is within the allowable period, thereby allowing simplification of the determination process.

Subsequently, the CPU 10 adds a predetermined value to the score data D5 (S64), and ends the simultaneous operation determination process and the operation type determination process. Then, the CPU 10 returns the processing to the main process.

Next, a process to be performed when the result of the judgment is YES in step S61 will be described. When the result of the judgment is that the simultaneous operation determination time t3 has elapsed from the detection timing of the first operation of pressing the operation button 72 (YES in S61), the CPU 10 judges that the latter operation of pressing the operation button 72 has not been performed substantially simultaneously with the first operation of pressing the operation button 72, thereby determining the representation of failed operation as the content of representation to be provided (S65). The details of the representation of failed operation and the process performed in step S65 are the same as those described of step S35, and thus the descriptions thereof are omitted. Then, the CPU 10 ends the process and returns the processing to the main process.

Next, a process to be processed when the result of the judgment is NO in step S62 will be described. When the result of the judgment is that the detection timing (that is, this point of time) of the latter operation of pressing the operation button 72 is not within the allowable period (NO in S62), the CPU 10 determines that the simultaneous operation has not been performed within the allowable period, and executes the above described process of step S65, thereby determining the representation of failed operation as the content of representation to be provided (S65). As described above, at the timing at which the simultaneous operation is judged to be correct, unlike the case of the timing in which the single operation is judged to be correct and the representation starts immediately after the detection of the A button 72*d* being pressed, the representation does not start until the latter operation of pressing the operation button 72 is detected or the simultaneous operation determination time t3 elapses from the first operation of pressing the operation button 72. As a result, there is a time lag between the time of the first operation by the user of pressing the operation buttons 72 and the time when the representation starts. Then, the CPU 10 ends the simultaneous operation determination process and the operation type determination process, and returns the processing to the main process.

Next with reference to FIG. 20, the single operation determination process will be described. First, the CPU 10 turns OFF the third determination flag D8 and ends the time measuring started from when the third determination flag D8 is turned ON (S71). Then, the CPU 10 judges whether the simultaneous operation determination time t3 has elapsed from the detection timing of the A button 72*d* being pressed based on the measured time started when the third determination flag D8 is turned ON (S72). Here, when a result of the judgment is that the simultaneous operation determination time t3 has not elapsed from the detection timing of the A button 72*d* being pressed (NO in S72), the CPU 10 determines that the user has mistakenly performed the simultaneous operation and determines the second stage representation of failed operation as described with reference to FIG. 13 as the content of representation to be provided (S73). Specifically, the CPU 10 updates the image generation data D4*a* and D4*c* for demonstrating an action corresponding to the second stage representation of failed operation. For example, as described with reference to FIG. 13, the image generation data D4*a* is for demonstrating an action in which the reference object O1 remains in the state of having swung down the sword, while the image generation data D4*c* is for demonstrating an action in which the instruction object O3 flees from the sword.

When the CPU 10 determines the second stage representation of failed operation as the content of representation to be provided, the process is performed in the subsequent rendering process of step S9 so that the reference object O1 and the instruction object O3 respectively perform the actions during the course of several frames.

Then, the CPU 10 a perform a process for cancelling the score added to the score data D5 in step S29 (S74), that is, a process for subtracting the predetermined value added in step S29 from the score data D5. Accordingly, at the timing at which the single operation is judged to be correct, by incrementing the score temporarily when the A button 72*d* is detected being pressed without waiting until the simultaneous operation determination time t3 elapses after the A button 72*d* is pressed, a process can be quickly performed when the B button 72*i* is not pressed before the simultaneous operation determination time t3 elapses after the A button 72*d* is pressed (when the single operation has been properly performed). When the B button 72*i* is pressed before the simultaneous operation determination time t3 elapses after the A button 72*d* is pressed (when an improper operation has been performed), by cancelling the temporarily added score, the added score can be prevented from being conclusive despite the improper operation performed by the user. Then, the CPU 10 ends the single operation determination process and the operation type determination process, and returns the processing to the main process.

On the other hand, when the result of the judgment is that the simultaneous operation determination time t3 has elapsed from the detection timing of the A button 72*d* being pressed (YES in S72), the CPU 10 determines that that user has correctly performed the single operation and determines the second stage representation of successful operation as described with reference to FIG. 14 as the content of representation to be provided (S75). Specifically, the CPU 10 updates the image generation data D4*a* and D4*c* for demonstrating an action corresponding to the second stage representation of successful operation. For example, as described with reference to FIG. 13, the image generation data D4*a* is for demonstrating the action in which the reference object O1 remains in the state of having swung down the sword, while the image generation data D4*c* is for demonstrating the action in which the instruction object O3 is cut off by the sword.

When the second stage representation of successful operation is determined as the content of representation to be provided, the process is performed in the subsequent rendering process of step S9 so that the reference object O1 and the instruction object O3 respectively perform the actions during the course of several frames. Then, the CPU 10 ends the single operation determination process and the operation type determination process and returns the processing to the main process.

The example of the operation type determination process has been described with reference to FIGS. 17 to 20. Next, how the operation type determination process is performed in the examples shown in FIGS. 9 to 11 will be described. First, the example of FIG. 9 will be described. As in FIG. 9, when the A button 72*d* is pressed first at the timing at which the simultaneous operation is judged to be correct (and when the A button 72*d* is pressed simultaneously with the B button 72*i*), steps S21(YES in S21), S22 (NO in S22), S25 (YES in S25), and S26 are performed.

Then, when the B button 72*i* is pressed before the simultaneous operation determination time t3 elapses after the A button 72*d* is pressed, the following steps are performed. That is, steps S37 (YES in S37), S38 (YES in S38), S39, and S40 are performed. It is noted that when the B button 72*i* is detected being pressed during a process of a frame immediately after the simultaneous operation determination time t3 elapses, processes similar to the above steps are performed. However, in this case, it is judged NO in step 61 of the simultaneous operation determination process (S40), and step S65 is performed.

On the other hand, when the B button 72*i* is not pressed before the simultaneous operation determination time t3 elapses after the A button 72*d* is pressed, the following steps are performed. That is, steps S37 (NO in S37), S46 (YES in S46), S47 (YES in S47), S48, and S49 are performed.

On the other hand, when the B button 72*i* is pressed first in the example of FIG. 9, steps S21 (NO in S21), S33 (NO in S33), S37 (YES in S37), S38 (NO in S38), S41 (NO in S41), S43 (YES in S43), and S44 are performed.

Then, when the A button 72*d* is pressed before the simultaneous operation determination time t3 elapses after the B button 72*i* is pressed, the following steps are performed. That is, steps S21 (YES in S21), S22 (YES in S22), S23, and S24 are performed. It is noted that processes similar to the above steps are performed when the A button 72*d* is detected being pressed during a process of the frame immediately after the simultaneous operation determination time t3 elapses. However, in this case, it is judged NO in step 61 of the simultaneous operation determination process (S24), and step S65 is performed.

On the other hand, when the A button 72*d* is not pressed before the simultaneous operation determination time t3 elapses after the B button 72*i* is pressed, steps S21 (NO in S21), S33 (YES in S33), S34 (YES in S34), S35, and S36 are performed.

Next, the example of FIG. 10 will be described. In this example, the A button 72*d* is pressed at the timing at which the single operation is judged to be correct, and steps S21 (YES in S21), S22 (NO in S22), S25 (NO in S25), S27 (YES in S27), and S28 are performed. In the example of the upper arrow of FIG. 10 (the operation button 72 is pressed outside the single operation period t2*a*), it is judged NO in step S28 and step S32 is performed. On the other hand, in the example of the lower arrow of FIG. 10 (the operation button 72 is pressed within the single operation period t2*a*), it is judged YES in step S28, and steps S29 to S31 are performed.

Then, when the B button 72*i* is not pressed before the simultaneous operation determination time t3 elapses after the A button 72*d* is pressed, steps S37 (NO in S37), S46 (NO in S46), S50 (YES in S50), S51 (YES in S51), S52, and S53 are performed.

On the other hand, when the B button 72*i* is pressed before the simultaneous operation determination time t3 elapses after the A button 72*d* is pressed, steps S37 (YES in S37), S38 (NO in S38), S41 (YES in S41), and S42 are performed. It is noted that processes similar the above steps are performed when the B button 72*i* is detected being pressed during a process of the frame immediately after the simultaneous operation determination time t3 elapses. However, in this case, it is judged YES in step S72 of the single operation determination process (S42), and step S75 is performed.

Next, the example of FIG. 11 will be described. In the example of FIG. 11, when the B button 72*i* is pressed at an improper timing, steps S37 (YES in S37), S38 (NO in S38), S41 (NO in S41), S43 (NO in S43), and S45 are performed. When the A button 72*d* is pressed at an improper timing, steps S21 (YES in S21), S22 (NO in S22), S25 (NO in S25), S27 (NO in S27), and S32 are performed.

As described above, in the present embodiment, even when operation timings of the two operation buttons 72 (the A button 72*d* and the B button 72*i*) deviate slightly from each other, it is judged that the simultaneous operation has been performed. Specifically, if the operation of pressing one of the A button 72*d* and the B button 72*i*, whichever is pressed later, has been performed before the simultaneous operation determination time t3 elapse after the operation of pressing one of the A button 72*d* and the B button 72*i*, whichever is pressed first, it is judged that the simultaneous operation has been performed. Accordingly, even when the operation timings deviate from each other to a level that can be judged to be substantially simultaneous, it can be judged that the simultaneous operation has been performed, and thus the user need not pay attention to strictly simultaneously performing the operations of the two operation buttons 72.

Further, at the timing at which the simultaneous operation is judged to be correct, it is judged that the simultaneous operation has been performed within the simultaneous operation period t2, if only the operation (the latter operation) of pressing one of the two operation buttons 72, whichever is pressed later, is detected within the allowable period (within the simultaneous operation period t2). Accordingly, besides that the user need not pay attention to strictly simultaneously performing the operations of the two operation buttons 72, the user only need to pay attention to performing the latter operation within the allowable period, thereby improving convenience in operation by the user. When the simultaneous operation is required, the user tends to feel that the user has performed a proper operation if one of the two operations has been performed within the allowable period. Therefore, by adopting the above configuration, inconvenience such as judging an operation to be improper although the user feels that the user properly has performed the operation, can be overcome.

Further, in the present embodiment, it is judged that the proper operation has been performed only if the latter operation is detected within the allowable period. Here, if it is determined whether the detection timing of the operation of pressing one of the two operation buttons 72, whichever is pressed first (first operation), is within the allowable period, the detection timing of the first operation needs to be stored. In addition, when the latter operation is detected, a relatively complicated process needs to be performed in order to judge whether the stored detection timing of the first operation is within the allowable period. In contrast, in the present embodiment, when the latter operation is detected, it is judged whether the operation has been performed at a proper timing through a relatively simple process in which it is judged whether the this point of time is within the allowable period.

In the following, a modification f the present embodiment will be described.

(1) In the present embodiment, whether the simultaneous operation has been performed within the allowable period is judged by using the detection timing of the latter operation, however, the detection timing of the first operation may be used.

(2) In the present embodiment, the single operation is the operation of pressing the A button 72*d*, however, it may be the operation of pressing either the A button 72d or the B button 72i. Each of the simultaneous operation and the single operation is the operation of pressing the operation buttons (the operation buttons 72), however, the operation is not limited to the operation of pressing the operation buttons. For example, in a ease of a stick type operation buttons, may be an operation of inclining the operation buttons. In addition, the operation is not limited to the operation of the operation buttons, and it may be, for example, an operation of pointing at predetermined positions on a screen (such as: an operation of touching predetermined positions on a touch panel; and an operation of aiming a controller or the like at predetermined positions on the screen of the television 2).

(3) In the present embodiment, the simultaneous operation is the operation of substantially simultaneously performing the two types of operations (of pressing the A button 72d and of pressing the B button 72i), it may be an operation of substantially simultaneously performing three or more types of operations. In this case, whether the simultaneous operation has been performed at a proper timing may be judged depending on whether any one type of the operations has been performed within the allowable period, and whether all of the three or more types of operations are performed before the simultaneous operation determination time t3 elapses after one of the three or more types of operations which is detected first of all is detected.

(4) In the present embodiment, the user is required to perform the two types of operations, that is, the single operation and the simultaneous operation, however, the user may be required to perform only the simultaneous operation.

(5) In the present embodiment, the present invention is applied to the music game program, however, the present invention is not necessarily applied to the music game program. In other words, the present invention may be applied to other game programs in which an operation is needs to be performed along with a musical piece. Alternatively, the present invention may be applied to other programs other than the game program.

(6) In the example of the present embodiment, the present invention is applied to the stationary game apparatus, however, the present invention is also applicable to a hand-held game apparatus, a mobile phone, any information processing apparatus such as a general personal computer, and the like.

(7) Part of the music game processing may be performed by a server.

While example embodiments of the present invention has been described in detail, the foregoing description is in all aspects illustrative and not restrictive. It should be understood that numerous other modifications and variations can be devised without departing from the scope of the invention.

What is claimed is:

1. A non-transitory computer-readable storage medium having stored therein an input determination program for causing a computer of an information processing apparatus to determine whether there has been an input to each of first input device and second input device, the input determination program causing the computer to provide functionality comprising:
   a first determination for determining, before a predetermined time period elapses after a determination that there has been an input to one of the first input device and the second input device, whether there has been an input to the other of the first input device and the second input device;
   a second determination for determining whether one of: a first timing which is a timing of the input to the one of the first input device and the second input device; and a second timing which is a timing of an input to the other of the first input device and the second input device is within a first specific period; and
   a third determination for determining, when a result of the determination by the first determination and a result of the determination by the second determination are affirmative, that there have been the inputs to the first input device and the second input device at a correct timing.

2. The non-transitory computer-readable storage medium according to claim 1, wherein
   the first specific period is a time period for requiring substantially simultaneous inputs from a user to both of the first input device and the second input device.

3. The non-transitory computer-readable storage medium according to claim 1, wherein
   the second determination determines whether the second timing is within the first specific period.

4. The non-transitory computer-readable storage medium according to claim 1, wherein
   the input determination program causes the computer to further function as fourth determination for determining, when a period other than the first specific period has come, upon a determination that there has been an input to one of the first input device and the second input device, whether the input has been performed at a correct timing.

5. The non-transitory computer-readable storage medium according to claim 4, wherein
   the fourth determination determines whether, before the predetermined time period elapses after the determination that there has been the input to the one of the first input device and the second input device, whether the input has been performed at the correct timing.

6. The non-transitory computer-readable storage medium according to claim 5, wherein
   the input determination program causes the computer to further function as storage for causing a storage section connected to the information processing apparatus to store therein timing determination data for defining: the first specific period as the time period for requiring substantially simultaneous inputs from the user to both of the first input device and the second input device; a second specific period as a time period for requiring an input from the user to one of the first input device and the second input device; and a third specific period for requiring no input from the user to either the first input device or the second input device, and
   the fourth determination determines, when it is determined that one of the second specific period and the third specific period has come based on the timing determination data, upon a determination that there has been an input to one of the first input device and the second input device, whether the input has been performed at a correct timing.

7. The non-transitory computer-readable storage medium according to claim 6, wherein
   the fourth determination includes:
      an input determination for making a provisional determination, when it is determined that the second specific period has come based on the timing determination data, upon a determination that there has been an input to one of the first input device and the second input device is in the second specific period, that there has been a correct input; and
      a cancellation for cancelling the provisional determination that there has been the correct input, upon a determination that there has been an input to the other of the first input device and the second input device before the predetermined time period elapses after the determination that there has been the input to the one of the first input device and the second input device.

8. The non-transitory computer-readable storage medium according to claim 7, wherein
the input determination program causes the computer to further function as representation process for causing, when the input determination makes the provisional determination that there has been the correct input, a display section connected to the information processing apparatus to display thereon a first representation in accordance with the correct input.

9. The non-transitory computer-readable storage medium according to claim 8, wherein
the representation process, when the provisional determination that there has been the correct input is cancelled by the cancellation, switches from the first representation to a second representation whose content is different from and subsequent to that of the first representation.

10. The non-transitory computer-readable storage medium according to claim 8, wherein
the representation process, when: the predetermined time period elapses after the determination that there has been the input to the one of the first input device and the second input device; and the provisional determination that the there has been the correct input is not cancelled by the cancellation, switches from the first representation to a third representation whose content is different from and subsequent to that of the first representation.

11. The non-transitory computer-readable storage medium according to claim 6, wherein
the fourth determination determines, when it is determined that the third specific period has come based on the timing determination data, upon a determination that there has been an input to one of the first input device and the second input device, that the input has been performed at an incorrect timing.

12. The non-transitory computer-readable storage medium according to claim 1, wherein
the input determination program causes the computer to further function as an audio processing for performing audio processing to output a musical piece from a sound emission section connected to the information processing apparatus.

13. The non-transitory computer-readable storage medium according to claim 1, wherein
the input determination program causes the computer to further function as:
a first specific period determination device for determining whether the first specific period falls within a predetermined period immediately after the first timing or immediately before and after the first timing, and
the first determination and the second determination only when a result of the determination by the first specific period determination is affirmative.

14. An information processing apparatus for determining whether there has been an input to each of first input device and second input device, the apparatus comprising:
a first determination device configured to determine, before a predetermined time period elapses after a determination that there has been an input to one of the first input device and the second input device, whether there has been an input to the other of the first input device and the second input device;

a second determination device configured to determine whether one of: a first timing which is a timing of the input to the one of the first input device and the second input device; and a second timing which is a timing of an input to the other of the first input device and the second input device is within a first specific period;
a third determination device configured to determine, when a result of the determination by the first determination device and a result of the determination by the second determination device are affirmative, that there have been the inputs to the first input device and the second input device at a correct timing.

15. A system for determining whether there has been an input to each of first input device and second input device, the system comprising:
a computer system, including a computer processor, the computer system being configured to at least perform:
a first determination for determining, before a predetermined time period elapses after a determination that there has been an input to one of the first input device and the second input device, whether there has been an input to the other of the first input device and the second input device;
a second determination for determining whether one of: a first timing which is a timing of the input to the one of the first input device and the second input device; and a second timing which is a timing of an input to the other of the first input device and the second input device is within a first specific period;
a third determination for determining, when a result of the determination by the first determination and a result of the determination by the second determination are affirmative, that there have been the inputs to the first input device and the second input device at a correct timing.

16. The system according to claim 15, wherein
the first specific period is a time period for requiring substantially simultaneous inputs from a user to both of the first input device and the second input device.

17. The system according to claim 15, wherein
the second determination determines whether the second timing is within the first specific period.

18. The system according to claim 15, wherein
the input determination program causes the computer to further function as fourth determination for determining, when a period other than the first specific period has come, upon a determination that there has been an input to one of the first input device and the second input device, whether the input has been performed at a correct timing.

19. The system according to claim 15, wherein
the input determination program causes the computer to further function as an audio processing for performing audio processing to output a musical piece from a sound emission section connected to the information processing apparatus.

20. The system according to claim 15, wherein
a computer system is further configured at least to perform:
a first specific period determination device for determining whether the first specific period falls within a predetermined period immediately after the first timing or immediately before and after the first timing, and
the first determination and the second determination only when a result of the determination by the first specific period determination is affirmative.

21. An information processing method comprising:
performing an input determination of determining whether there has been an input to each of first input device and second input device;
performing a first determination of determining, before a predetermined time period elapses after the determination that there has been the input to one of the first input device and the second input device, whether there has been an input to the other of the first input device and the second input device;
performing a second determination of determining whether one of: a first timing which is a timing of the input to the one of the first input device and the second input device; and a second timing which is a timing of an input to the other of the first input device and the second input device is within a first specific period;
performing a third determination of determining, when a result of the first determination and a result of the second determination are affirmative, that there have been the inputs to the first input device and the second input device at a correct timing.

* * * * *